(12) United States Patent
Caverni et al.

(10) Patent No.: US 9,462,512 B2
(45) Date of Patent: Oct. 4, 2016

(54) RADIO NETWORK CONTROLLER, A USER EQUIPMENT, A RADIO NETWORK NODE AND METHODS THEREIN

(71) Applicant: Telefonaktiebolaget LM Ericsson (publ), Stockholm (SE)

(72) Inventors: Alessandro Caverni, Stockholm (SE); Johan Hultell, Solna (SE); Paulson Angelo Vijay Silveris, Spånga (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 563 days.

(21) Appl. No.: 13/701,355

(22) PCT Filed: Sep. 27, 2012

(86) PCT No.: PCT/SE2012/051031
§ 371 (c)(1),
(2) Date: Nov. 30, 2012

(87) PCT Pub. No.: WO2013/048325
PCT Pub. Date: Apr. 4, 2013

(65) Prior Publication Data
US 2014/0079020 A1    Mar. 20, 2014

Related U.S. Application Data

(60) Provisional application No. 61/541,295, filed on Sep. 30, 2011.

(51) Int. Cl.
*H04W 4/00* (2009.01)
*H04W 36/00* (2009.01)
*H04B 17/327* (2015.01)
*H04B 7/02* (2006.01)

(52) U.S. Cl.
CPC ....... *H04W 36/0027* (2013.01); *H04B 17/327* (2015.01); *H04W 36/0083* (2013.01); *H04B 7/022* (2013.01)

(58) Field of Classification Search
CPC .................................................. H04W 36/0027
USPC .......................................................... 370/331
See application file for complete search history.

(56) References Cited

U.S. PATENT DOCUMENTS

| 7,046,648 B2* | 5/2006 | Zhang | H04L 1/1887 370/331 |
| 2004/0162100 A1* | 8/2004 | Moon | H04W 52/327 455/522 |

(Continued)

FOREIGN PATENT DOCUMENTS

WO    2009/155480 A1    12/2009

OTHER PUBLICATIONS

3GPP TSG RAN WG2 #60bis, R2-080444, NTT DoCoMo, T-Mobile; eNB measurements for RAN performance monitoring, entire document, Jan. 14-18, 2008.*

(Continued)

*Primary Examiner* — Maharishi Khirodhar
(74) *Attorney, Agent, or Firm* — Patent Portfolio Builders, PLLC

(57) ABSTRACT

A radio network controller 10 and a method therein for selecting two or more cells 21,22 for simultaneous transmission of data to a user equipment 30 by at least one radio network node 20 controlling the two or more cells 21,22. The user equipment 30 is capable of Multi Point High Speed Downlink Packet Access, MP-HSDPA, transmissions. When a second cell 22 that is an active non High Speed Downlink Shared Channel (HS-DSCH) cell, has a better signal quality than a first cell 21 that is an active HS-DSCH cell, the radio network controller 10 selects the second cell 22 to become an active HS-DSCH cell and to be one of the two or more cells 21,22 for simultaneous transmission of data to the user equipment 30.

18 Claims, 15 Drawing Sheets

(56) References Cited

U.S. PATENT DOCUMENTS

| | | | | |
|---|---|---|---|---|
| 2010/0103875 A1* | 4/2010 | Simonsson | ......... | H04W 76/022 370/328 |
| 2011/0013599 A1* | 1/2011 | Shukla et al. | ................ | 370/332 |
| 2011/0044168 A1* | 2/2011 | N Das | .................. | H04L 1/0002 370/232 |

OTHER PUBLICATIONS

3GPP TSG RAN WG2 Meeting #57, R2-114082, Alcatel-Lucent;Mobility in HSDPA Multipoint Transmission; entire document, Aug. 22-26, 2011.*

NTT DoCoMO (eNB measurements for RAN performance monitoring, Jan. 14-18, 2008, R2-080444).*

NTT DoCoMo et al., "eNB Measurements for RAN Performance Monitoring," 3GPP TSG RAN WG2 #60bis, T doc-R2-080444, Jan. 18, 2008, pp. 1-4, Seville, Spain.

Alcatel-Lucent et al., "Mobility in HSDPA Multipoint Transmission," 3GPP TSG-RAN WG2 Meeting #75, R2-114082, Aug. 26, 2011, pp. 1-4, Athens, Greece.

ZTE, "Consideration on Special Mobility Aspects for MPT-HSDPA," 3GPP TSG-RAN WG2 meeting #75bis, R2-114910, Oct. 10, 2011, pp. 1-3, Zhuhai, China.

3rd Generation Partnership Project; Technical Specification Group Radio Access Network; High Speed Packet Access (HSDPA) multipoint transmission (Release 11); 3GPP TR 25.872 V11.0.0, Sep. 2011; pp. 1-29.

3rd Generation Partnership Project; Technical Specification Group Radio Access Network; Radio Resource Control (RRC); Protocol specification (Release 10); 3GPP TS 25.331 V10.5.0; Sep. 2011; pp. 1926-1968.

* cited by examiner

RADIO NETWORK CONTROLLER, A USER EQUIPMENT, A RADIO NETWORK NODE AND METHODS THEREIN

TECHNICAL FIELD

Embodiments herein relate to a network node controller, a user equipment, a radio network node and to methods therein. In particular, embodiments herein relate to the selection of two or more cells for simultaneous transmission of data to a user equipment.

INTRODUCTION

Communication devices such as User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipment are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: GroupeSpécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In High Speed Packet Access (HSPA) multipoint transmission, multiple cells can transmit the same or different data to the same user equipment simultaneously using the same or different frequencies. See for example Technical Report 25.872, HSPA Multipoint Transmission, incorporated herein by reference, which describes several transmission modes. One transmission mode relates to switched transmit diversity techniques, e.g., High Speed-data discontinuous transmission (HS-DDTx)), where transmissions to a single user equipment can occur from multiple cells. But at any given time-instance, transmission can only occur from one cell to that user equipment. Another transmission mode relates to multi-flow transmission techniques, e.g., Single Frequency-Dual Cell-High Speed Downlink Packet Access (SF-DC-HSDPA), where transmissions of different data can occur from multiple downlink cells simultaneously. The cells can either be located on the same frequency or on different frequencies. A third transmission mode relates to single frequency network transmissions (e.g., High Speed-Single Frequency Network transmission (HS-SFN multipoint)) where transmissions of identical signals are sent to the user equipment from multiple cells. Because identical signals, i.e., the same scrambling code, modulation and coding scheme, etc., are transmitted from the multiple cells, those signals can be added together at the user equipment to achieve a better signal to interference plus noise ratio.

In addition to different transmission techniques, there are intra-site and inter-site coordination transmission techniques evaluated. For intra-site coordination, all cells wherefrom data can be transmitted to a user equipment are controlled by one logical baseband unit, e.g. a scheduling entity 1 or a scheduling entity 2, as shown in FIG. 1. A baseband unit can also be implemented in a way so that its functionality is distributed across multiple cells (possibly at different locations) but where direct communication between the different parts of the functionality is supported by means of, e.g., some proprietary interface. This means that information for the cells can be shared without involving an RNC 10 or other radio network control node. See FIG. 2. Another example of intra-site scenario is a Main Unit-Remote Radio Unit (MU-RRU) solution in which multiple cells with antennas 20 at different physical locations share a baseband unit, e.g. a scheduling entity 1 or a scheduling entity 2 as schematically illustrated in FIG. 3. For inter-site coordination, cells wherefrom data can be transmitted to a UE are controlled by multiple logical baseband units, e.g. scheduling entities 1 and 2 in FIG. 3, who only can share information with each other by means of sending it via the RNC 10. An example is illustrated in FIG. 3.

For all multi-point transmission techniques, transmission of data to one user equipment occurs from multiple different cells at the same time. To maximize multi-point transmission performance benefits, it is desirable that the transmission from a multi-point secondary cell that complements the user equipment's serving cell. More specifically, a multi-point secondary cell transmission to the UE should have a sufficient path gain that is preferably on par with the path gain of the serving cell. A low load in the multi-point secondary cell is also preferable so that there are resources available for a user equipment configured in a Multi Point-High Speed Downlink Packet Access (MP-HSDPA) mode.

One of the challenges for MP-HSDPA transmission techniques relates how to select and maintain the set of downlink cells from which the data transmission to the user equipment occurs. For example, in the current WCDMA/HSPA specifications, a serving High Speed Downlink Shared Cannel (HS-DSCH) cell is decided based on Radio Resource Control (RRC)-configured events. See sub-clauses 14.1.2 and 14.1.3 in the 3GPP Technical Specification 25.331 Radio Resource Control (RRC) incorporated herein by reference. In this standard, existing intra-frequency mobility events are designed to (1) maintain one serving HS-DSCH cell, e.g., Event 1D (change of best cell) may be used to identify the one best cell, and (2) maintain a sufficiently large active set, e.g., based on Event 1A (add a cell to the active set) and Event 1B (remove a cell from the active set). The "active set" size is also important both for controlling interference and improving the coverage by way of soft handover (SHO) gain for uplink transmission. For downlink transmissions, maintaining an active set size is important for achieving the SHO gain.

But there are some limitations to the existing mobility events specified in TS 25.331 for single-carrier HSDPA in Rel-5. For example, existing mobility event reports are designed to only indicate: the strongest downlink cell, the cells that are within a predefined range of the best (serving) cell, and the cells belonging to the same carrier, e.g., UTRA Absolute Radio Frequency Channel Number (UARFCN). Although this design may be sufficient for transmission techniques where transmissions on a carrier only occur from one cell to a UE, these mobility measurement event reports do not provide the radio network, e.g., a serving radio network controller (S-RNC) with information that enables it to select a group of more than one downlink cell possibly transmitting on different frequencies in the active set wherefrom data transmissions should take place to a user equipment. Another potential drawback is that existing mobility event measurements do not account for the downlink load.

For changing the best cell, 3GPP TS 25.331 defines an intra-frequency event (Event 1D). But again, this event is not suitable for the case where a user equipment is configured with MP-HSDPA operation because it is only triggered when there is a change of the single best cell. In other words, this event does not cover the case where the best cell remains unchanged, but there is a change of second best cell in the active set.

Yet another limit with existing mobility events is that for user equipments configured with multi-carrier downlink HSDPA (MC-HSDPA), the mobility is only based on measurements associated with the serving HS-DSCH cell. The serving HS-DSCH cell is herein sometimes referred to as the "primary carrier". This is because the user equipment, if it is configured with a single uplink frequency, always has that single uplink frequency associated with the serving HS-DSCH cell. But if a user equipment is configured with multiple downlink carriers and two adjacent uplink carriers as for 3GPP Release-9 DC-HSUPA, two independent active sets can be maintained, e.g. one for each frequency. While this gives the network information about the best cells for each individual carrier, it does not inform the network of the relative strength of cells associated with different carriers. For example, if the user equipment has two cells in the primary active set, e.g. cell x and cell y, for frequency f1, and the user equipment has two cells in the secondary active set, e.g. cell z and cell w, for frequency f2, the existing events does not inform the network about the relative ranking of cell x and/or cell y versus cell z and/or cell w.

Ultimately, none of the mobility procedures specified for MC-HSDPA are sufficient for addressing the needs associated with MP-HSDPA.

SUMMARY

The technology described below allows a network to select a group of two or more cells, where each cell in that group transmits data simultaneously to a user equipment capable of MP-HSDPA transmissions. In one example embodiment, the user equipment informs a radio network node, e.g., a base station like a Node-B and/or a control node like an S-RNC, about the n best cells, where n is an integer greater than 1, and their relative priority based on some pre-defined quality criterion. In another example embodiment, the network node may use existing information to evaluate the relative priority of the cells in the user equipment's active set, and based on one or more different criteria, select the n best downlink cells. Selecting n best cells for MP-HSDPA transmission increases user equipment and overall system performance as compared to using just one cell.

When used herein by the expressions "an active set" or "a user equipment's active set" is meant a set of cells comprising both non HS-DSCH cells and HS-DSCH cells, which cells are active for the user equipment. The non HS-DSCH cells and HS-DSCH cells comprised in the active set is herein sometimes referred to as active non HS-DSCH cells and active HS-DSCH cells, respectively. Further, by the expression "a non HS-DSCH cell" when used herein is meant a cell, e.g. a HS-DSCH cell or any other cell, that is not configured for HS-DSCH for a specific user equipment, but it could be for another user equipment.

An object of embodiments herein is to provide a way of improving the performance in a communications network.

According to a first aspect of embodiments herein, the object is achieved by a method in a radio network controller for selecting two or more cells for simultaneous transmission of data to a user equipment by at least one radio network node controlling the two or more cells. The user equipment is capable of Multi Point High Speed Downlink Packet Access, MP-HSDPA, transmissions. Further, when a second cell that is an active non High Speed Downlink Shared Channel, HS-DSCH, cell, has a better signal quality than a first cell that is an active HS-DSCH cell, the radio network controller selects the second cell to become an active HS-DSCH cell and to be one of the two or more cell for simultaneous transmission of data to the user equipment.

According to a second aspect of embodiments herein, the object is achieved by a radio network controller for selecting two or more cells for simultaneous transmission of data to a user equipment by at least one radio network node controlling the two or more cells. The user equipment is capable of Multi Point High Speed Downlink Packet Access, MP-HSDPA, transmissions. The radio network controller comprises a selecting circuit configured to select a second cell that is an active non High Speed Downlink Shared Channel, HS-DSCH, cell, to become an active HS-DSCH cell and to be one of the two or more cells for simultaneous transmission of data to the user equipment, when the second cell has a better signal quality than a first cell that is an active HS-DSCH cell.

According to a third aspect of embodiments herein, the object is achieved by a method in a user equipment for assisting a radio network controller in selecting two or more cells for simultaneous transmission of data to the user equipment by at least one radio network node controlling the two or more cells. The user equipment is capable of Multi Point High Speed Downlink Packet Access, MP-HSDPA, transmissions. The user equipment receives a measurement control message from the radio network controller. Based on the received measurement control message, the user equipment determines when a second cell that is an active non HS-DSCH cell has a better signal quality than a first cell that is an active HS-DSCH cell. Further, the user equipment transmits a measurement report to the radio network controller, whereby the radio network controller selects the second cell to become an active HS-DSCH cell and to be one of the two or more cells for simultaneous transmission of data to the user equipment.

According to a fourth aspect of embodiments herein, the object is achieved by a user equipment for assisting a radio network controller in selecting two or more cells for simultaneous transmission of data to the user equipment by at least one radio network node controlling the two or more cells. The user equipment is capable of Multi Point High Speed Downlink Packet Access, MP-HSDPA, transmissions. Further, the user equipment comprises a receiving circuit configured to receive a measurement control message from the radio network controller and a determining circuit configured to determine, based on the received measurement control message, when a second cell that is an active non HS-DSCH cell has a better signal quality than a first cell that is an active HS-DSCH cell. Further, the user equipment comprises a transmitting circuit configured to transmit a measurement report to the radio network controller, whereby the radio network controller selects the second cell to become an active HS-DSCH cell and to be one of the two or more cells for simultaneous transmission of data to the user equipment.

According to a fifth aspect of embodiments herein, the object is achieved by a method in a radio network node for assisting a radio network controller in selecting two or more cells for simultaneous transmission of data to a user equipment by at least one radio network node controlling the two or more cells. The user equipment is capable of Multi Point High Speed Downlink Packet Access, MP-HSDPA, transmissions. The radio network node measures a fraction of uplink Enhanced Dedicated Channel, E-DCH, packets transmitted from the user equipment and received at a radio network node. Further, the radio network node transmits a measurement result to the radio network controller, whereby the radio network controller reconfigures the radio network node controlling a second cell that is an active non HS-DSCH cell such that the active second cell becomes an active HS-DSCH cell and is one of the two or more cells for simultaneous transmission of data to the user equipment.

According to a sixth aspect of embodiments herein, the object is achieved by a radio network node for assisting a radio network controller in selecting two or more cells for simultaneous transmission of data to a user equipment by at least one radio network node controlling the two or more cells. The user equipment is capable of Multi Point High Speed Downlink Packet Access, MP-HSDPA, transmissions. The radio network node comprises a measuring circuit configured to measure a fraction of uplink Enhanced Dedicated Channel, E-DCH, packets transmitted from the user equipment and received at a radio network node. Further, the radio network node comprises a transmitting circuit configured to transmit a measurement result to the radio network controller, whereby the radio network controller reconfigures the radio network node controlling a second cell that is an active non HS-DSCH cell such that the second cell becomes an active HS-DSCH cell and is one of the two or more cells for simultaneous transmission of data to the user equipment.

Since a second cell that is an active non HS-DSCH cell is selected to become an active HS-DSCH cell and to be one of the two or more cells for simultaneous transmission of data to the user equipment, when the second cell has a better signal quality than a first cell that is an active HS-DSCH cell, the performance of the user equipment is increased. This results in an improved performance in the communications network.

An advantage of embodiments herein is that they provide that the two or more cells selected to become active HS-DSCH cells are the cells with the best signal quality. Thereby the cells that provide the highest downlink throughput are selected, and hence e the system performance is improved.

A further advantage of embodiments herein is that the selection of the two or more cells to become active HS-DSCH cells, may be carried out by different entities, e.g. by the radio network controller, the radio network node and/or by the user equipment. Thereby, robustness of the communications network is ensured.

A yet further advantage of embodiments herein is that they may be based on different selection criteria, hence ensuring flexibility to the communications network.

BRIEF DESCRIPTION OF THE DRAWINGS

Examples of embodiments herein are described in more detail with reference to attached drawings in which.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Embodiments herein will be exemplified in the following non-limiting description.

Figure 1:
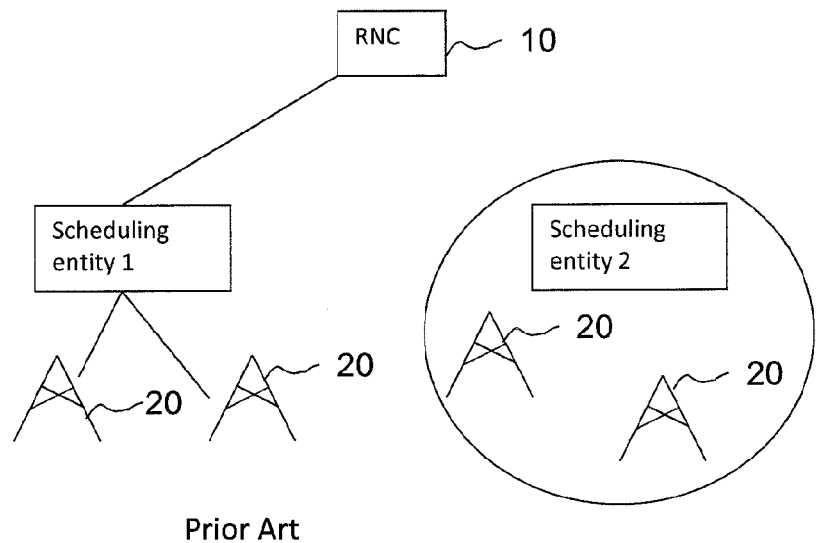
FIG. 1 schematically illustrates a communications network according to prior art.
Figure 2:
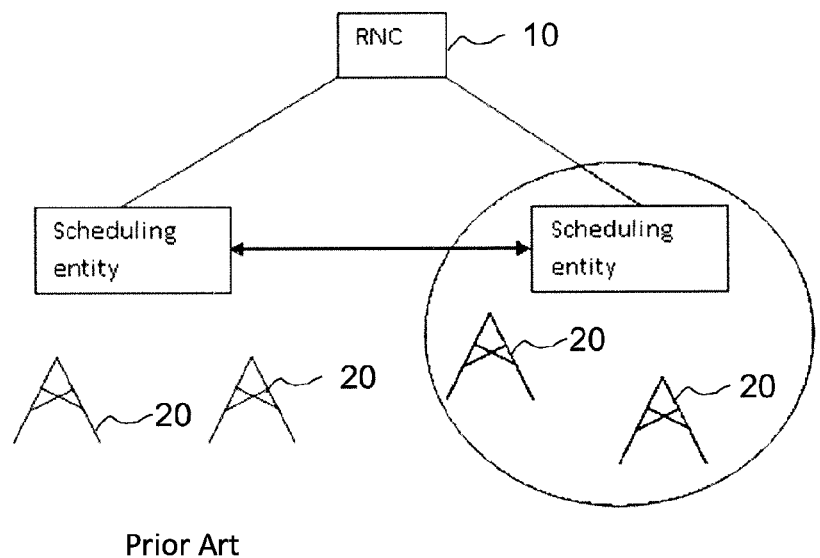
FIG. 2 schematically illustrates a communications network according to prior art.
Figure 3:
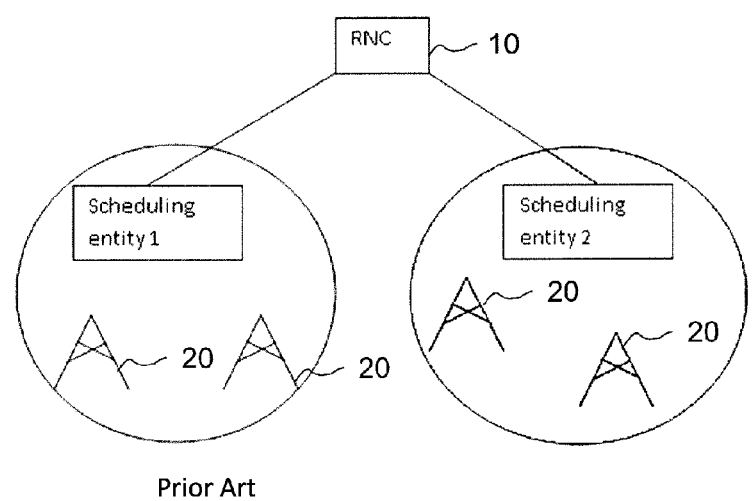
FIG. 3 schematically illustrates a communications network according to prior art.
Figures 4A, 4B:
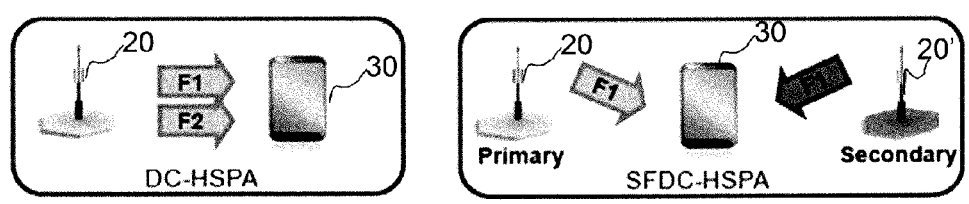
FIGS. 4a and 4b schematically illustrate embodiments of communications networks using DC-HSPA and SF-DC-HSPA, respectively.
Figure 5:
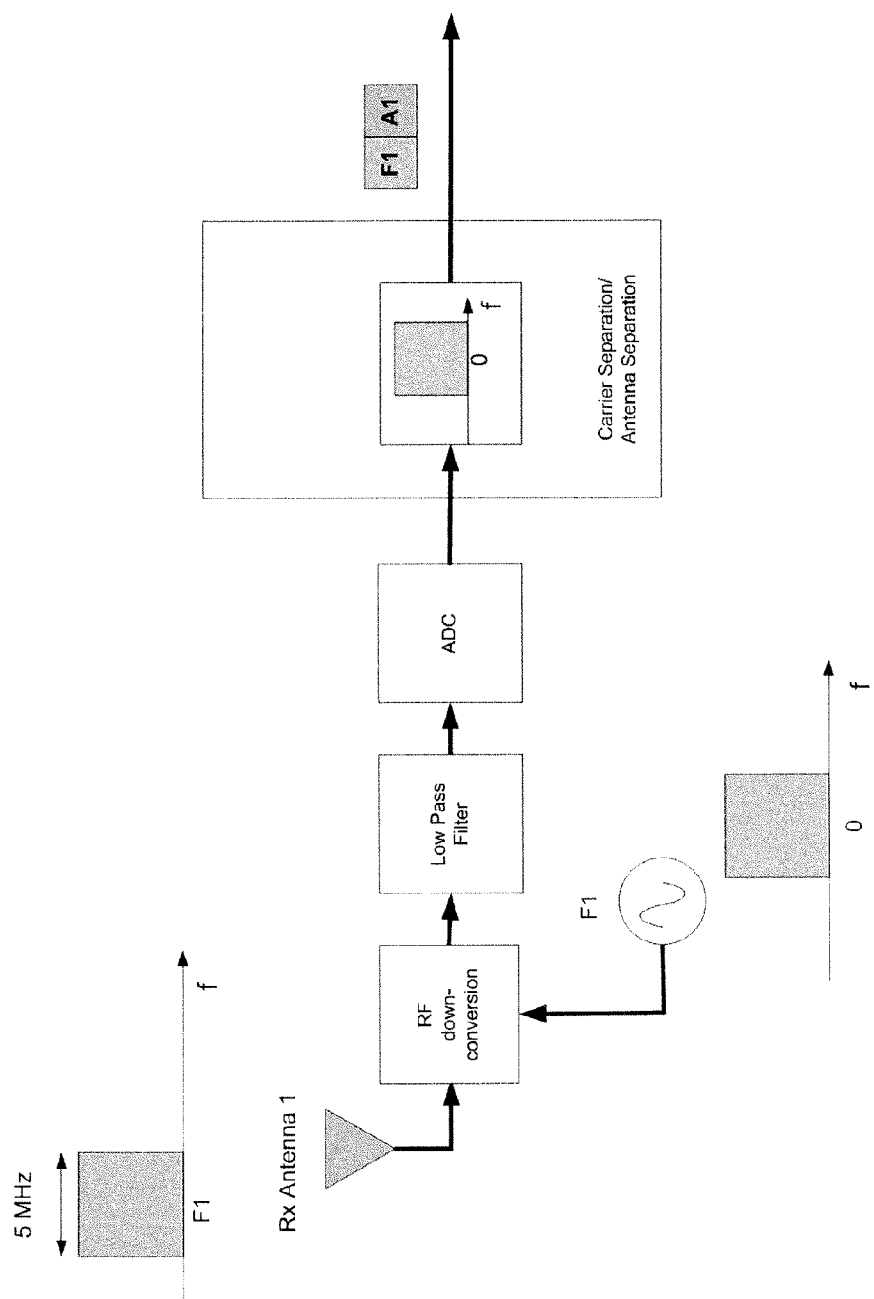
FIG. 5 schematically illustrates an example single receive antenna, SF-DC-HSDPA switching receiver RF/Front End.
Figure 6:
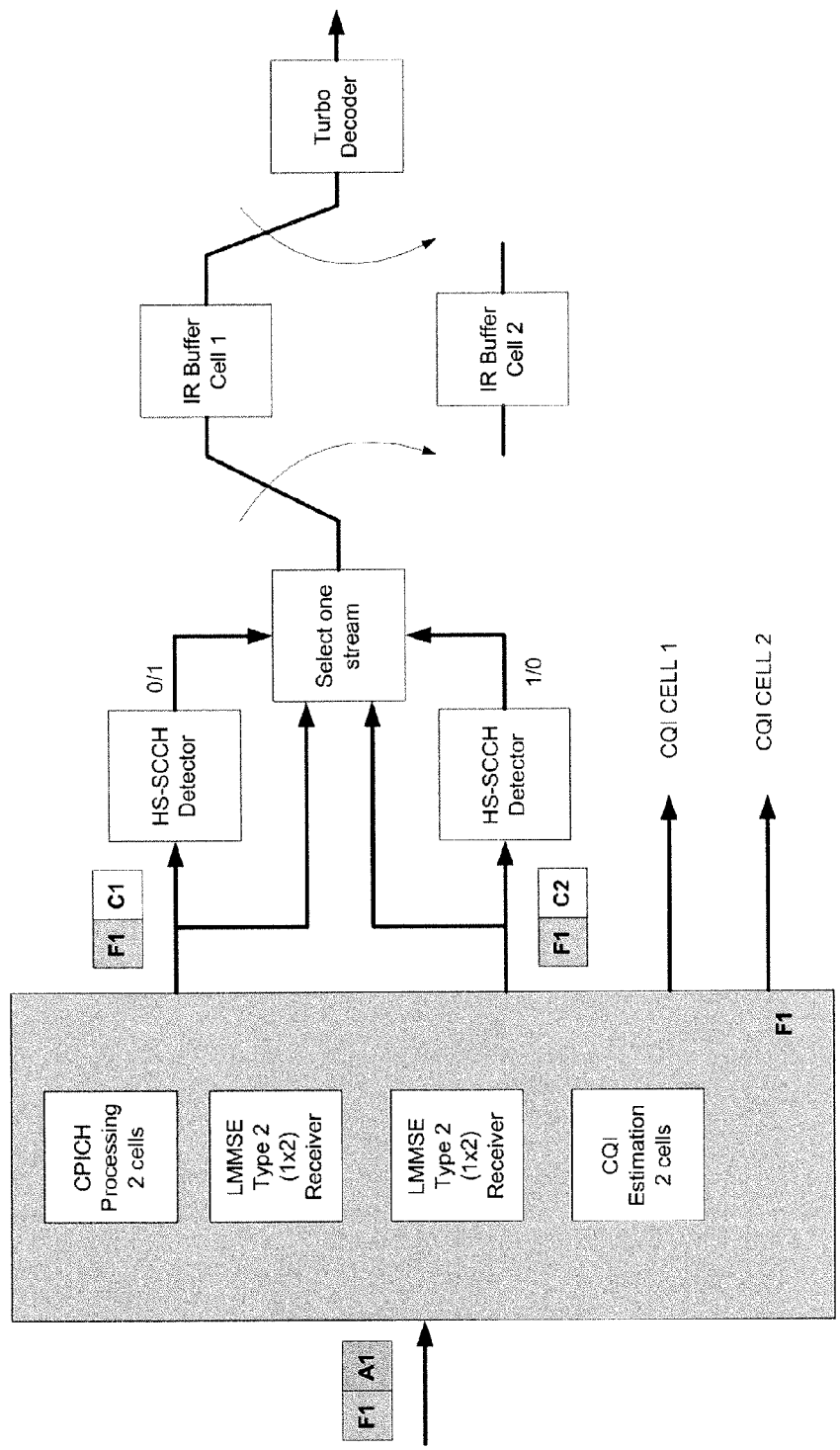
FIG. 6 schematically illustrates an example single receive antenna, SF-DC-HSDPA switching receiver baseband processing.
Figure 7:
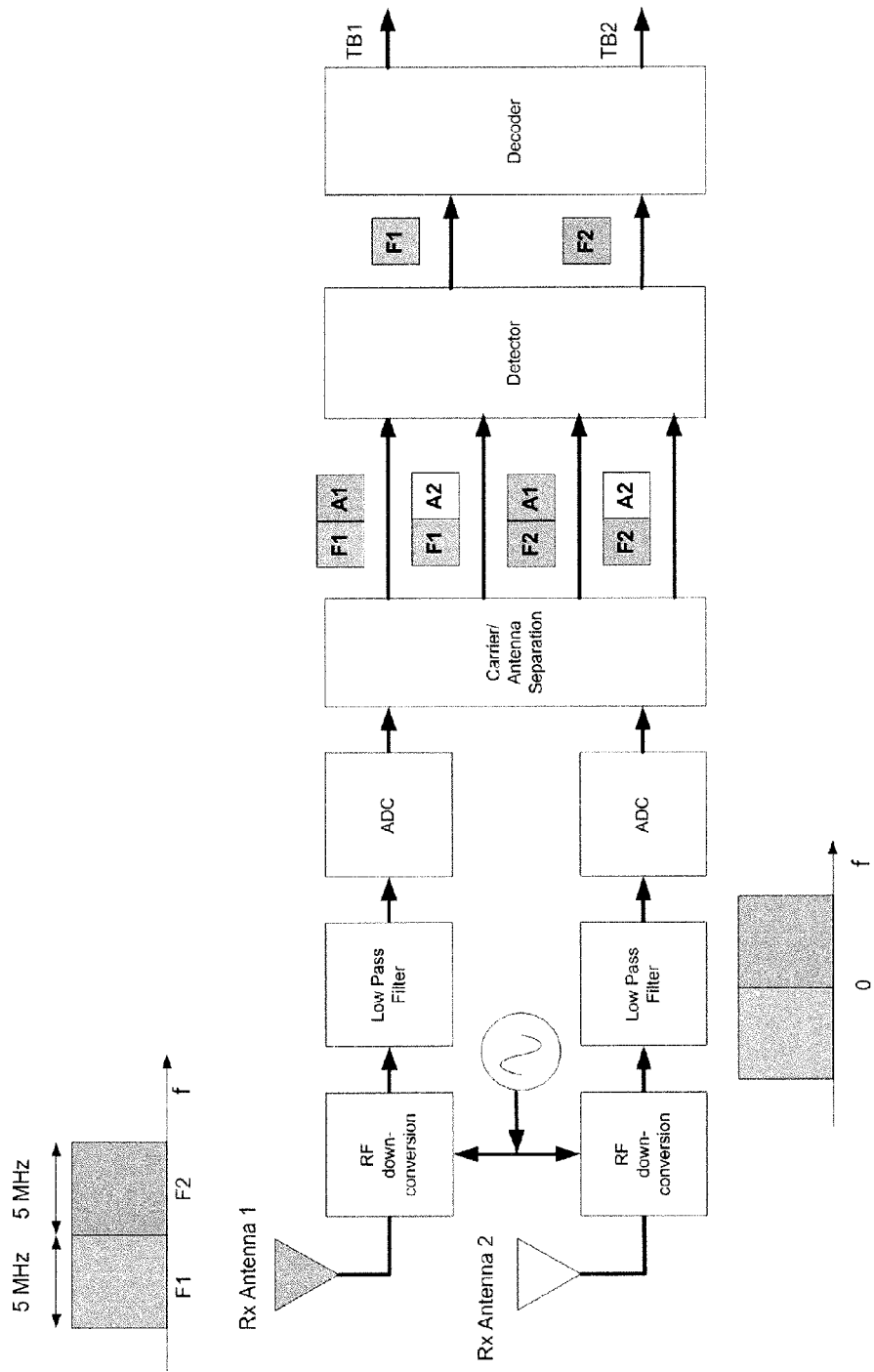
FIG. 7 schematically shows an example high level block diagram for a DC-HSDPA user equipment receiver.
Figure 8:
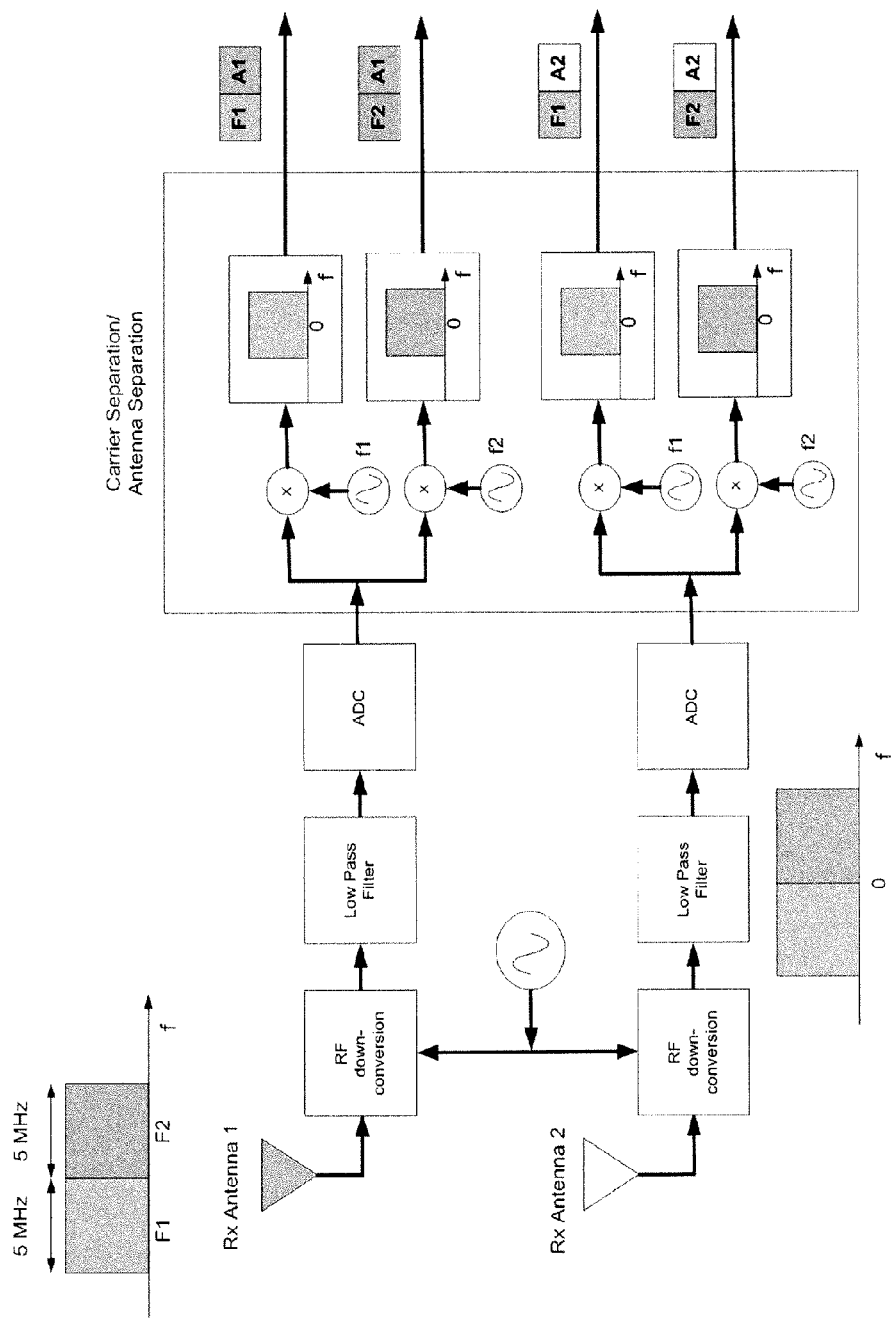
FIG. 8 schematically shows an example block diagram for an RF/front end SF-DC-HSDPA receiver.
Figure 9:
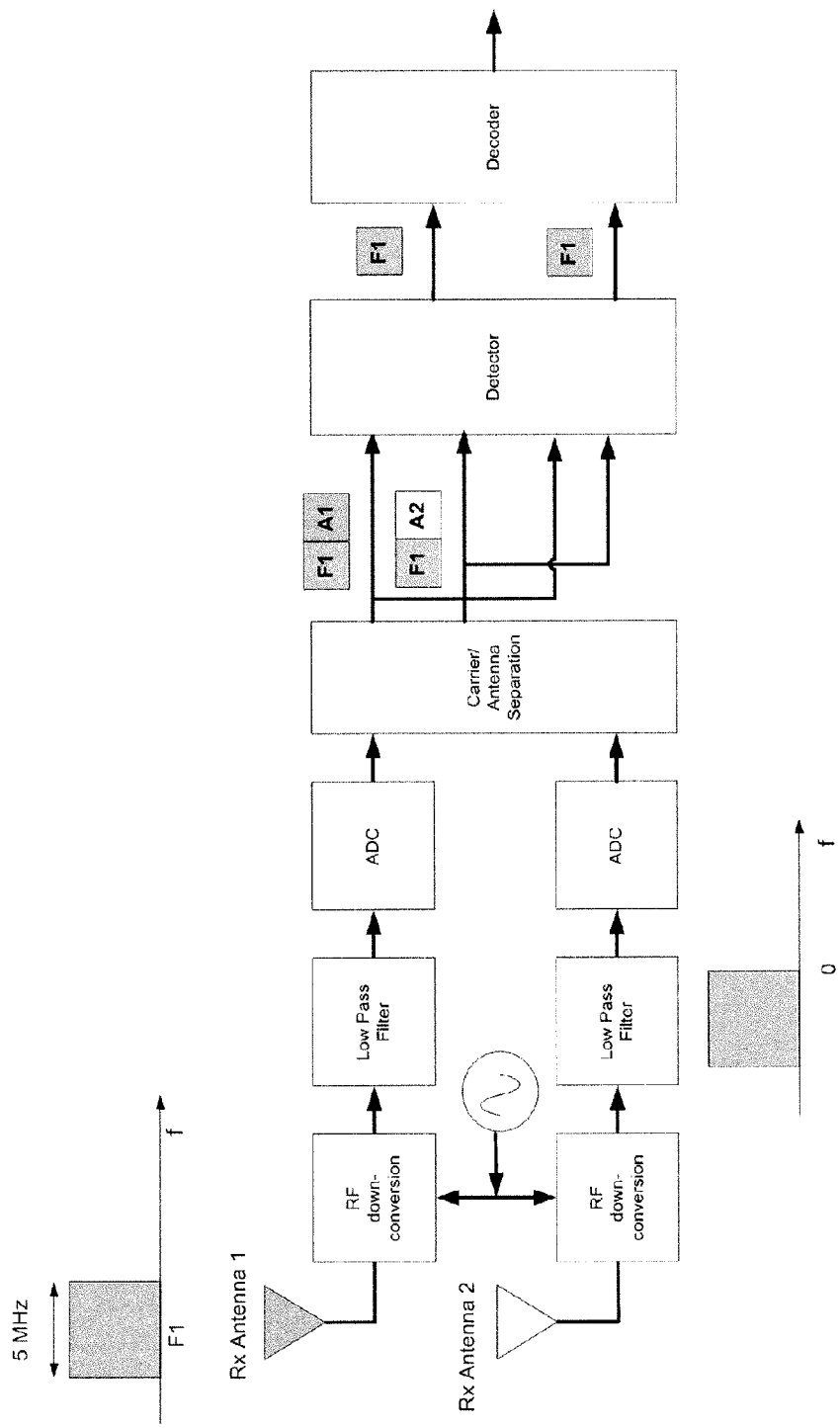
FIG. 9 schematically shows an example high level block diagram for an SF-DC-HSDPA aggregation receiver.

FIGS. 4a and 4b illustrate conceptually Dual Cell HSPA (DC-HSPA) and Single Frequency Dual cell HSPA (SF-DC-HSPA), respectively. FIG. 4a schematically illustrates a radio network node 20 simultaneously transmitting from two downlink cells to a user equipment 30. The two cells are located on frequency F1 and F2, respectively. FIG. 4b schematically illustrates a primary radio network node 20 and a secondary radio network node 20' transmitting on a frequency F1 to the user equipment 30. It should be understood that according to some definitions, the primary radio network node 20 may sometimes be referred to as a serving radio network node, and the secondary radio network node 20' may sometimes be referred to as an assisting serving radio network node. FIGS. 5-9 illustrate example hardware that may be used. FIG. 5 shows an example single receive antenna, SF-DC-HSDPA switching receiver RF/Front End, and FIG. 6 illustrates an example single receive antenna, SF-DC-HSDPA switching receiver baseband processing. FIG. 7 shows an example high level block diagram for a DC-HSDPA user equipment receiver, FIG. 8 shows an example block diagram for an RF/front end SF-DC-HSDPA receiver, and FIG. 9 shows an example high level block diagram for an SF-DC-HSDPA aggregation receiver.

Figure 10A:
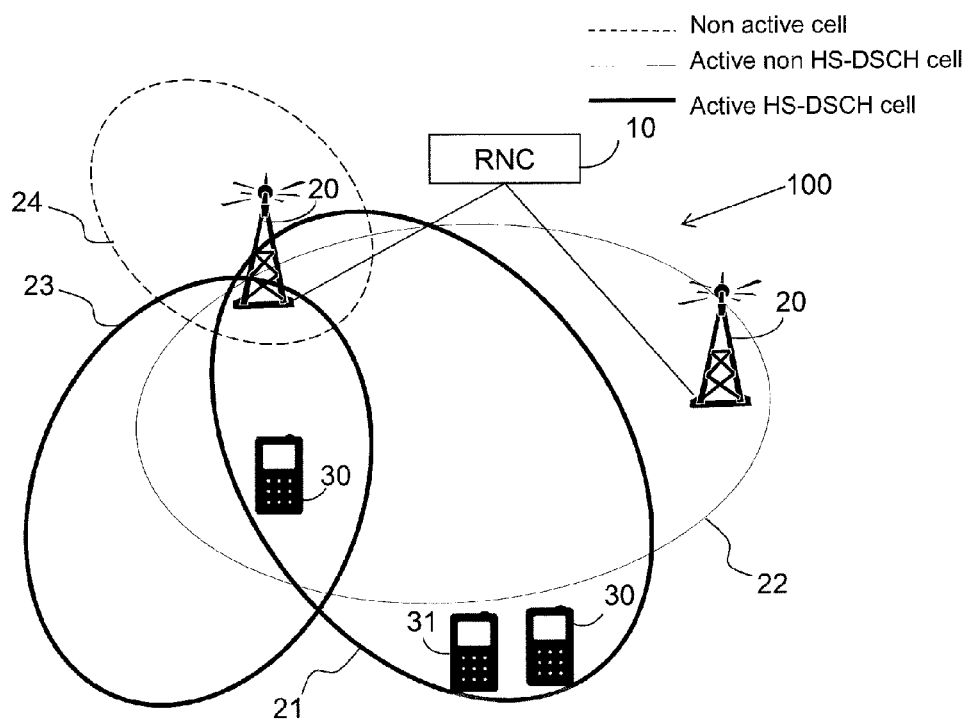
FIGS. 10a and 10b schematically illustrate some embodiments of a communications network.
Figure 10B:
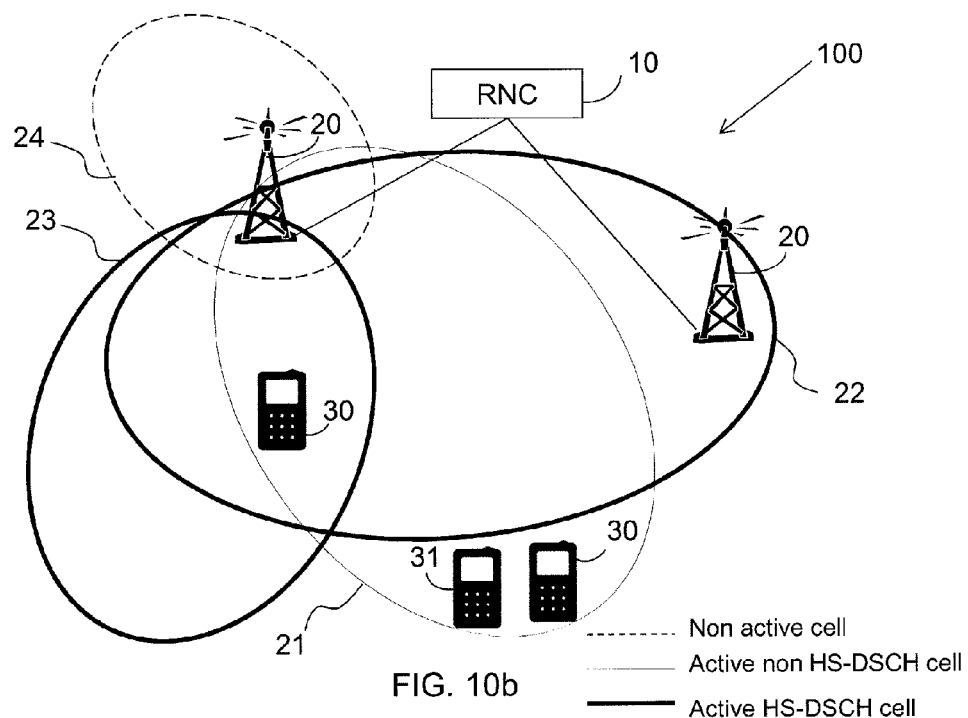

FIGS. 10a and 10b schematically illustrate a communications network 100 according to some embodiments herein. The communications network 100 may be a radio communications network such as a 3GPP communications network or a non-3GPP communications network. It should be understood that the radio communications network 100 may comprise one or more radio communications networks (not shown). Each radio communications network may be configured to support one or more Radio Access Technologies (RATs). Further, the one or more radio communications networks may be configured to support different RATs. Some examples of RATs are GSM, WCDMA, and LTE.

The communications network 100 comprises a Radio Network Controller (RNC) 10. For example, the radio network controller 10 may be a WCDMA Radio Network Controller, a GSM Base Station Controller or a LTE eNodeB.

At least one radio network node 20 is further comprised in the communications network 100 and connected to the radio network controller 10. The radio network node 20 may be a base station such as an eNB, an eNodeB, Node B or a Home Node B, a Home eNode B, a radio network controller, a base station controller, an access point, a relay node which may be fixed or movable, a donor node serving a relay, a GSM/EDGE radio base station, a Multi-Standard Radio (MSR) base station or any other network unit capable to serve a user equipment or another network node comprised in the communications network 100.

Further, the radio network node 20 provides radio coverage over at least one geographical area 21,22,23,24, which herein sometime is referred to as a cell 21,22,23,24.

FIG. 10a schematically illustrates a first cell 21 and a third cell 23 as active HS-DSCH cells. Further, a second cell 22 is illustrated as an active non HS-DSCH cell, and a fourth cell 24 is illustrated as a non-active cell. In some embodiments, the third cell 23 may be considered to be a primary cell configured to serve the user equipment 30, and the first cell 21 may be considered to be a secondary cell assisting the primary cell in serving the user equipment 30. It should be understood that in such embodiments, the third cell 23 is sometimes referred to as a serving cell and that the first cell 21 is sometimes referred to as an assisting serving cell.

FIG. 10b schematically illustrates the second and third cells 22, 23 as active HS-DSCH cells; the first cell 21 as an active non HS-DSCH cell; and the fourth cell 24 as a non-active cell.

The radio communications system 100 comprises further at least one user equipment 30,31. The user equipment 30,31 is located within one or more of the cells 21,22,23,24 and is served by the radio network node 20. Further, the user equipment 30,31 transmits data over a radio interface to the radio network node 20 in an uplink (UL) transmission and the radio network node 20 transmits data to the user equipment 30,31 in a downlink (DL) transmission.

The first user equipment 30,31 may be e.g. a wireless device such as a mobile terminal or a wireless terminal, a mobile phone, a computer such as e.g. a laptop, a tablet pc, a Personal Digital Assistant (PDA), or any other radio network unit capable to communicate over a radio link in a cellular communications network. The first user equipment 30,31 may further be configured for use in both a 3GPP network and in a non-3GPP network.

In the FIGS. 10*a* and 10*b*, the user equipment 30 is a user equipment capable of Multi Point High Speed Downlink Packet Access, MP-HSDPA, transmissions and the user equipment 31 is a HS-DSCH capable user equipment 31. It should be understood that the HS-DSCH capable user equipment 31 does not have to be capable of MP-HSDPA. However, in some embodiments, the HS-DSCH capable user equipment 31 is also capable of MP-HSDPA.

UE-ASSISTED MP-HSDPA MOBILITY. Initially, an example embodiment describes how to select and control the change of a Multipoint HS-DSCH cell (MHS cell) depending on changes in radio conditions. In this description the expression "Multipoint (MP)" will be used, however, it should be understood that "Multipoint" sometimes is referred to as "Multiflow". In the initial example, 3GPP RRC measurement procedures are used for convenience but not limitation. A Multipoint HS-DSCH cell (MHS) is defined herein as a non-primary HS-DSCH cell configured for multipoint HS-DSCH transmission.

For mobility management of MHS cells, event-triggered or periodic measurement reports sent from the user equipment 30 to the radio network 100, e.g. to the radio network controller 10, may be used. The measurement reports may be based for example on Common Pilot Channel (CPICH) Received Signal Code Power (RSCP) and/or a ratio of energy per modulating bit to the noise spectral density (Ec/No). Of course, other measurement parameters, other signaling, etc. may be used.

Figure 11:
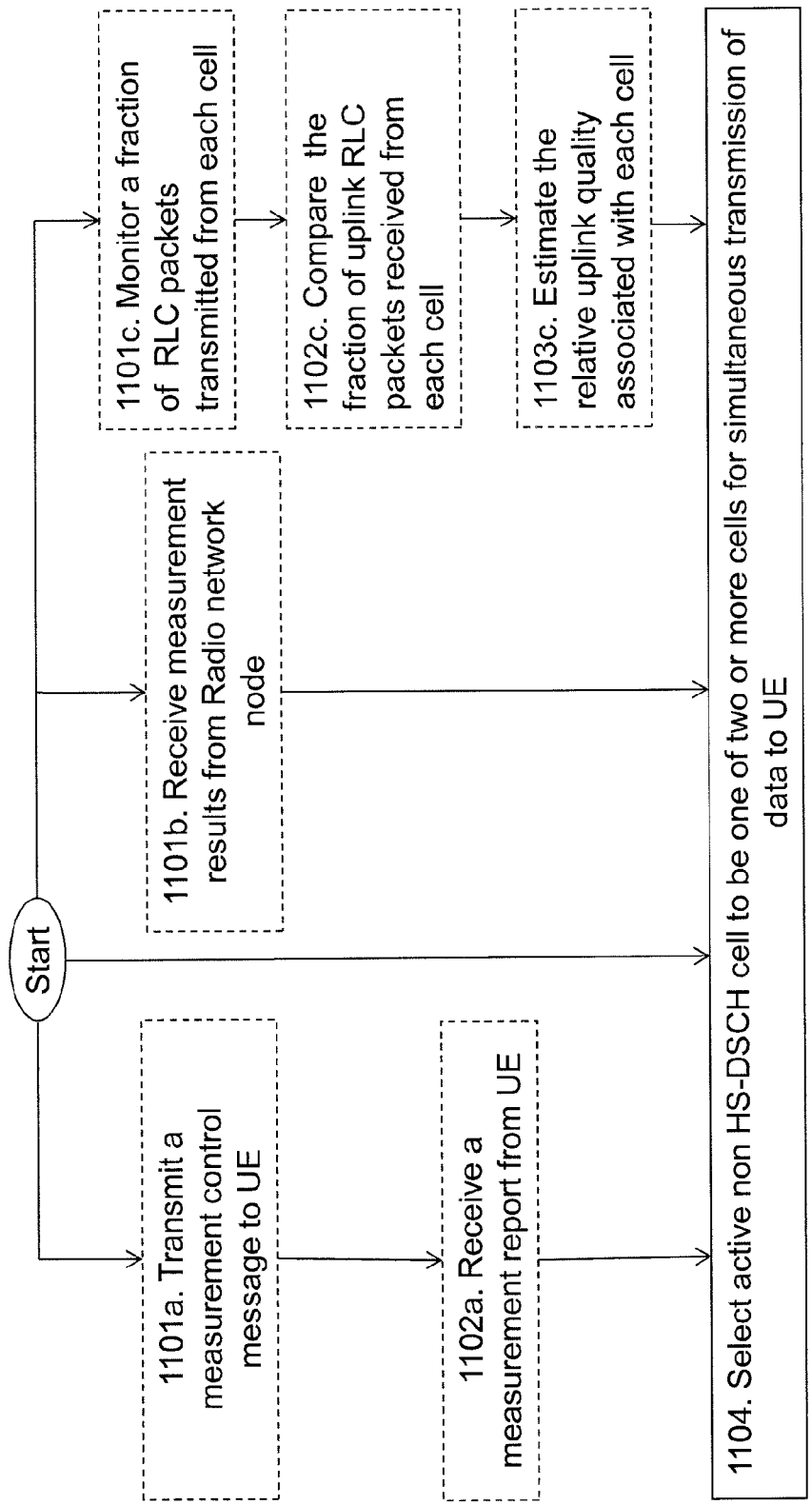
FIG. 11 is a flowchart depicting embodiments of a method in a radio network controller.

A method in a radio network controller 10 for selecting two or more cells 21,22 for simultaneous transmission of data to the user equipment 30 by at least one radio network node 20 controlling the two or more cells 21,22 will now be described with reference to FIG. 11. The actions do also relate to the FIGS. 18, 20, and 21 which will be described further below.

As previously mentioned, the user equipment 30 is capable of MP-HSDPA transmissions. Further, the radio network controller 10, the radio network node 20, the cells 21,22 and the user equipment 30 are comprised in the communications network 100.

The method comprises the following actions, which actions do not have to be performed in the order stated below, but may be taken in any suitable order. Further, actions may be combined. Optional actions are indicated by dashed boxes.

Action 1101*a*

In some embodiments, in order to receive a measurement report from the user equipment 30, cf. Action 1102*a* below, the radio network controller 10 transmits a measurement control message to the user equipment 30 capable of MP-HSDPA transmissions.

The measurement control message may comprise a set of candidate multipoint cells. In some embodiments, the set of candidate multipoint cells comprises one or more first cells 21 that are active HS-DSCH cells and/or one or more second cells 22 that are active non HS-DSCH cells for which cells 21,22 the user equipment 30 shall perform the measurements. The measurement control message may further comprise one or more of the measurements quantities, threshold, hysteresis, and time to trigger.

In some embodiments, the measurement control message is based on cell load, such as average flow control queue length and number of HS-DSCH user equipments 31 comprised in the first cell 21 that is an active HS-DSCH cell, or based on the transmit power of the radio network node 20.

As schematically illustrated in FIG. 10, the HS-DSCH user equipment 31 may be located in a part of the first cell 21 which part doesn't intersect the second and third cells 22, 23. As will be described below, the communications network 100, e.g. the radio network controller 10, may decide to exclude the second cell 22 from the measurement control because of high load.

Action 1101*b*

In some first alternative embodiments, the radio network controller 10 receives measurement results from at least one radio network node 20, which measurement results relate to a fraction of Enhanced Dedicated Channel (E-DCH) packets transmitted from the user equipment 30 and received at the at least one radio network node 20.

Action 1101*c*

In some second alternative embodiments, the radio network controller 10 monitors a fraction of uplink Radio Link Control (RLC) packets received in the radio network controller 10 and transmitted from each cell 21,22 comprised in an active set of the user equipment 30.

Action 1102*a*

In some embodiments, in response to the received measurement control message from the radio network controller 10 as described in Action 1101*a* above, the radio network controller 10 receives a measurement report from the user equipment 30 in response to the transmitted measurement control message. The measurement report indicates to the radio network controller 10 that the second cell 22 that is an active non HS-DSCH cell has a better signal quality than the first cell 21 that is an active HS-DSCH cell. This also relates to FIGS. 18 and 20, which will be described below.

The measurement report may be an intra-frequency report indicating to the radio network controller 10 that the second cell 22, i.e. the active non HS-DSCH cell, has become better than the first cell 21, i.e. the active HS-DSCH cell. The intra-frequency report may be an event 1K report. A non-limiting example of a potential measurement control configuration for the event 1K report will be given below.

In some embodiments, the measurement report is an inter-frequency report indicating to the radio network controller 10 that the second cell 22, i.e. an active non HS-DSCH cell, has become better than the first cell 21, i.e. an active HS-DSCH cell.

The inter-frequency report may be an event 8A report that is event-triggered. Further, the inter-frequency report may be a periodic report. A non-limiting example of potential measurement control configuration for the event 8A report will be given below.

Action 1102*c*

In some second alternative embodiments, the radio network controller 10 compares the fraction of uplink RLC packets received from each cell 21,22.

Action 1103*c*

In some second alternative embodiments, the radio network controller 10 estimates the relative uplink quality associated with each cell 21,22 based on the comparison performed in Action 1102*c* described above. The estimation may be performed by assuming that the best cell is the cell from which the highest number of RLC packets are received, and that the second best cell the cell from which the second highest number of RLC packets are received, etc.

Action 1104

When the second cell 22 that is an active non HS-DSCH cell has a better signal quality than the first cell 21 that is an active HS-DSCH cell, cf. FIG. 10*a*, the radio network controller 10 selects the second cell 22, i.e. the active non HS-DSCH cell, to become an active HS-DSCH cell and to be one of the two or more cells 21,22 for simultaneous transmission of data to the user equipment 30, cf. FIG. 10*b*. Thus, it should be understood that FIG. 10*a* schematically illustrates the first and second cells 21,22 before the selection, i.e. when the first cell 21 is an active HS-DSCH cell, and when the second cell 22 is an active non HS-DSCH cell. Further, it should be understood that FIG. 10*b* schematically illustrates the first and second cells 21,22 after the selection, i.e. when the first cell 21 possibly, but not necessarily, is an active non HS-DSCH cell, and when the second cell 22 is an active HS-DSCH cell.

In some embodiments, The radio network controller 10 further selects the second cell 22 to be an active non HS-DSCH cell by reconfiguring a radio network node 20 controlling the second cell 22 in dependence of the measurement report such that the second cell 22 becomes an active HS-DSCH cell and is one of the two or more cells 21,22 capable of transmitting data simultaneously to the user equipment 30.

The signal quality may be given by a Common Pilot Channel Received Signal Code Power, CPICH RSCP, or by a ratio of energy per modulation bit to noise spectral density, Ec/No. Thus, the second cell 22 may for example have a better signal quality than the first cell 21 when the CPICH RSCP or the Ec/No of the second cell 22 is better than the CPICH RSCP or the Ec/No of the first cell 21.

In some first alternative embodiments, the second cell 22, i.e. the active non HS-DSCH cell, has a better signal quality than the first cell 21, i.e. the active HS-DSCH cell, when a fraction of Enhanced Dedicated Channel, E-DCH, packets transmitted from the user equipment 30 and received at a radio network node 20 controlling the second cell 22 becomes higher than the fraction of E-DCH packets transmitted from the user equipment 30 and received at a radio network node 20 controlling the first cell 21. This relates to Action 1101*b* described above. In such embodiments, radio network controller 10 further selects the second cell 22, i.e. the active non HS-DSCH cell, by reconfiguring the radio network node 20 controlling the second cell 22 such that the second cell 22 becomes an active HS-DSCH cell and is one of the two or more cells 21,22 for simultaneous transmission of data to the user equipment 30.

Further, the radio network controller 10 may reconfigure the radio network node 20 by reconfiguring the radio network node 20 based on downlink load and on path gain and transmit power of the radio network node 20.

In some second alternative embodiments, the second cell 22, i.e. the active non HS-DSCH cell, has a better signal quality than the first cell 21, i.e. the active HS-DSCH cell, when a fraction of uplink RLC packets transmitted from the second cell 22 controlled by a radio network node 20 becomes higher than a fraction of uplink RLC packets transmitted from the first cell 21 controlled by a radio network node 20. This relates to Actions 1101*c*, 1102*c*, and 1103*c* described above. In such embodiments, the radio network controller 10 selects the second cell 22 to become an active HS-DSCH cell by reconfiguring the user equipment 30 and the radio network node 20 in dependence of the estimated relative uplink quality described in Action 1103*c* above.

Figure 12:
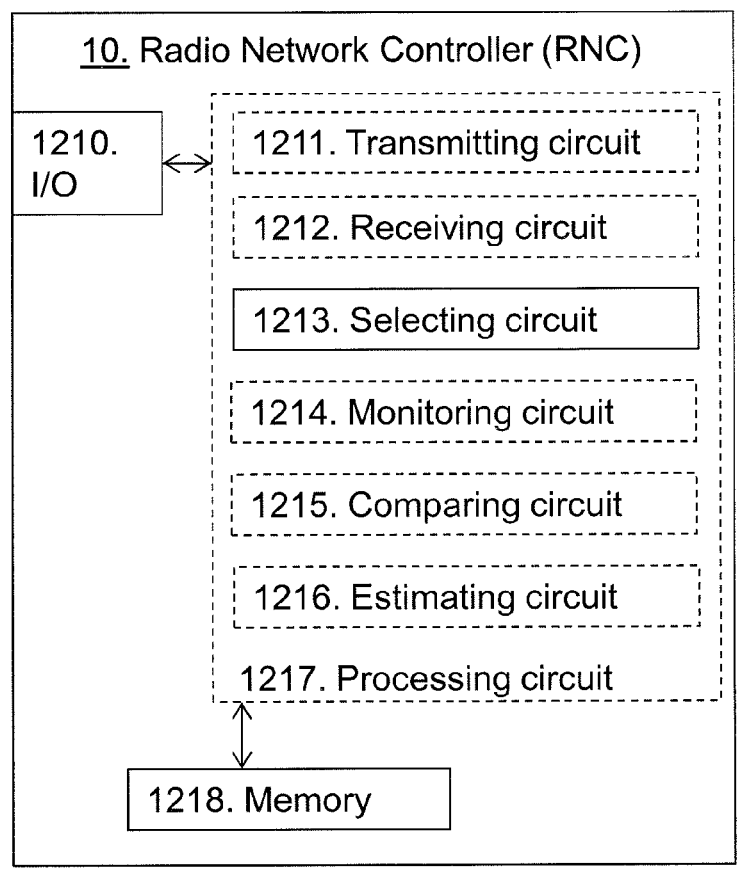
FIG. 12 is a schematic block diagram illustrating embodiments of a radio network controller.

To perform the method actions in the radio network controller 10 described above in relation to FIG. 11, the radio network controller 10 comprises the following arrangement depicted in FIG. 12. The radio network controller 10 is configured to select two or more cells 21,22 for simultaneous transmission of data to the user equipment 30 by at least one radio network node 20 controlling the two or more cells 21,22, which user equipment 30 is capable of Multi Point High Speed Downlink Packet Access, MP-HSDPA, transmissions.

As previously mentioned, the user equipment 30 is capable of MP-HSDPA transmissions. Further, the radio network controller 10, the radio network node 20, the cells 21,22 and the user equipment 30 are comprised in the communications network 100.

The radio network controller 10 comprises an input and output interface 1210 configured to function as an interface for communication in the communications network 100. The communication may for example be communication with the radio network node 20 and/or with the user equipments 30,31.

In some embodiments, the radio network controller 10 comprises a transmitting circuit 1211 configured to transmit a measurement control message to the user equipment 30 capable of MP-HSDPA transmissions.

The measurement control message may comprise a set of candidate multipoint cells. In some embodiments, the set comprises one or more first cells 21 that are active HS-DSCH cells and/or one or more second cells 22 that are active non HS-DSCH cells for which cells 21,22 the user equipment 30 shall perform the measurements. The measurement control message may further comprise one or more of the measurements quantities, threshold, hysteresis, and time to trigger. In some embodiments, the measurement control message is based on cell load, such as average flow control queue length and number of HS-DSCH user equipments 31 comprised in the first cell 21, i.e. in an active HS-DSCH cell, or based on the transmit power of the radio network node 20.

Further, the radio network controller 10 may comprise a receiving circuit 1212 configured to receive a measurement report from the user equipment 30 in response to the measurement control message. The measurement report indicates to the radio network controller 10 that the second cell 22, i.e. an active non High Speed Downlink Shared Channel, HS-DSCH, cell, has a better signal quality than the first cell 21, i.e. an active HS-DSCH cell.

In some embodiments, the measurement report is an intra-frequency report indicating to the radio network controller 10 that the second cell 22, i.e. the active non HS-DSCH cell, has become better than the first cell 21, i.e., the active HS-DSCH cell.

However, the measurement report may be an inter-frequency report indicating to the radio network controller 10 that the second cell 22, i.e. the active non HS-DSCH cell, has become better than the first cell 21, i.e. the active HS-DSCH cell.

In some embodiments, the inter-frequency report is an event 8A report that is event-triggered. Further, the inter-frequency report may be a periodic report.

In some first alternative embodiments, the receiving circuit 1212 is further configured to receive measurement results from at least one radio network node 20, which measurement results relate to a fraction of E-DCH packets transmitted from the user equipment 30 and received at the at least one radio network node 20.

The radio network controller 10 comprises a selecting circuit 1213 configured to select the third cell 23, i.e. the active non HS-DSCH cell, to become an active HS-DSCH cell and to be one of the two or more cells 21,22 for simultaneous transmission of data to the user equipment 30, when the second cell 22 has a better signal quality than the first cell 21, i.e. the active HS-DSCH cell.

The signal quality may be given by a Common Pilot Channel Received Signal Code Power, CPICH RSCP, or by a ratio of energy per modulation bit to noise spectral density, Ec/No.

In some embodiments, the selecting circuit 1213 is configured to reconfigure a radio network node 20 controlling the second cell 22, i.e. the active non HS-DSCH cell, in dependence of the measurement report such that the second cell 22 becomes an active HS-DSCH cell and is one of the two or more cells 21,22 capable of transmitting data simultaneously to the user equipment 30.

In some first alternative embodiments, the second cell 22, i.e. the active non HS-DSCH cell, has a better signal quality than the first cell 21, i.e. the active HS-DSCH cell, when a fraction of Enhanced Dedicated Channel, E-DCH, packets transmitted from the user equipment 30 and received at a radio network node 20 controlling the second cell 22 becomes higher than the fraction of E-DCH packets transmitted from the user equipment 30 and received at a radio network node 20 controlling the first cell 21. In such embodiments, the selecting circuit 1213 is further configured to reconfigure the radio network node 20 controlling the second cell 22 such that the second cell 22 becomes an active HS-DSCH cell and is one of the two or more cells 21,22 for simultaneous transmission of data to the user equipment 30. This also relates to FIG. 21 which will be described below.

Further, the selecting circuit 1213 may be configured to reconfigure the radio network node 20 based on downlink load and on path gain and transmit power of the radio network node 20.

In some second alternative embodiments, the selecting circuit 1213 is further configured to reconfigure the user equipment 30 and the radio network node 20 in dependence of the estimated relative uplink quality.

In some second alternative embodiments, the second cell 22, i.e. the active non HS-DSCH cell, has a better signal quality than the first cell 21, i.e. the active HS-DSCH cell, when a fraction of uplink uplink Radio Link Control (RLC) packets transmitted from the second cell 22 controlled by a radio network node 20 becomes higher than a fraction of uplink RLC packets transmitted from the first cell 21 controlled by a radio network node 20. In such embodiments, the radio network controller 10 further comprises a monitoring circuit 1214 configured to monitor a fraction of RLC packets received in the radio network controller 10 and transmitted from each cell 21,22 comprised in an active set of the user equipment 30.

In such second alternative embodiments, the radio network controller 10 further comprises a comparing circuit 1215 configured to compare the fraction of uplink RLC packets received from each cell 21,22.

Further, in such second alternative embodiments the radio network controller 10 further comprises an estimating circuit 1216 configured to estimate the relative uplink quality associated with each cell 21,22 based on the comparison.

Embodiments herein for selecting two or more cells 21,22 for simultaneous transmission of data to the user equipment 30 by at least one radio network node 20 controlling the two or more cells 21,22 may be implemented through one or more processors, such as a processing circuit 1217 in the arrangement depicted in FIG. 12, together with computer program code for performing the functions and/or method actions of embodiments herein.

It should be understood that one or more of the circuits comprised in the radio network controller 10 described above may be integrated with each other to form an integrated circuit.

The computer program code mentioned above may also be provided as a computer program product, for instance in the form of a data carrier carrying computer program code for performing the embodiments herein when being loaded into the radio network controller 10. One such carrier may be in the form of a CD or DVD. It is however feasible with other data carriers such as a memory stick, memory card or hard drive. The computer program code may furthermore be provided as pure program code on a server for download to the radio network controller 10. The computer program code may furthermore be provided in the form of a data file or files on, or available through, a server for download. The file or files may be executable files for direct or indirect download to and execution on the radio network controller 10, or may be for intermediate download and compilation to make them executable before download to and for execution on the radio network controller 10. The server may be accessible over a computer network, such as the Internet, and may e.g. be a web or ftp server.

Those skilled in the art will also appreciate that the input output interface 1210, the transmitting circuit 1211, the receiving circuit 1212, the selecting circuit 1213, the monitoring circuit 1214, the comparing circuit 1215, and the estimating circuit 1216 may refer to a combination of analog and digital circuits, and/or one or more processors configured with software and/or firmware (e.g., stored in memory) that, when executed by the one or more processors such as the processing circuit 1217, perform as described above. One or more of these processors, as well as the other digital hardware, may be included in a single Application-Specific Integrated Circuit (ASIC), or several processors and various digital hardware may be distributed among several separate components, whether individually packaged or assembled into a system-on-a-chip (SoC).

The radio network controller 10 may further comprise a memory 1218. The memory 1218 may comprise one or more memory units and may be used to store for example data such as information relating to the user equipments and radio network nodes, etc.

Figure 13:
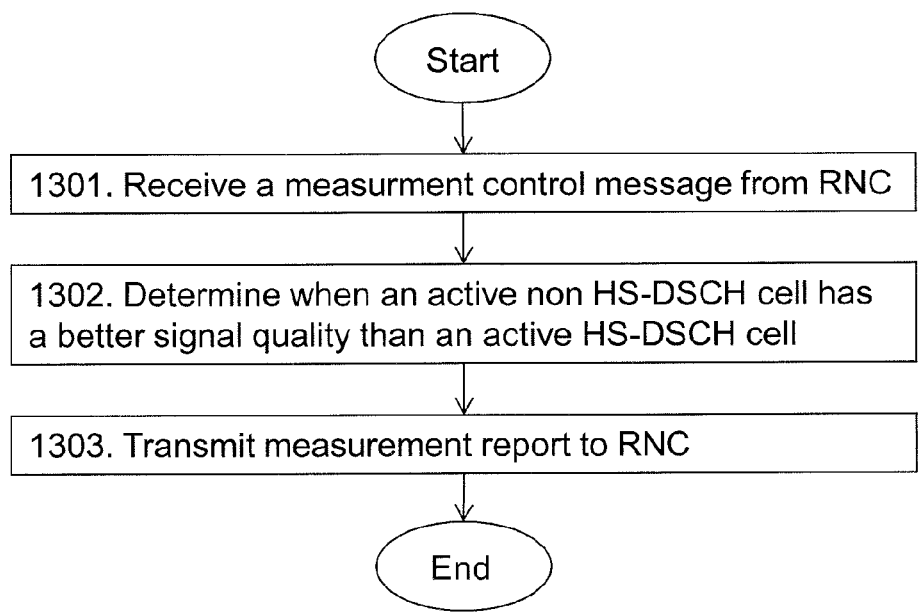
FIG. 13 is a flowchart depicting embodiments of a method in a user equipment.

A method in a user equipment 30 for assisting a radio network controller 10 for selecting two or more cells 21,22 for simultaneous transmission of data to the user equipment 30 by at least one radio network node 20 controlling the two or more cells 21,22 will now be described with reference to FIG. 13. The actions do also relate to FIGS. 18 and 20 which will be described further below.

As previously mentioned, the user equipment 30 is capable of MP-HSDPA transmissions. Further, the radio network controller 10, the radio network node 20, the cells 21,22 and the user equipment 30 are comprised in the communications network 100.

The method comprises the following actions, which actions do not have to be performed in the order stated below, but may be taken in any suitable order. Further, actions may be combined. Optional actions are indicated by dashed boxes.

Action 1301

The user equipment 30 receives a measurement control message from the radio network controller 10.

Action 1302

Based on the received measurement control message, the user equipment 30 determines when the second cell 22, i.e. the active non HS-DSCH cell, has a better signal quality than the first cell 21, i.e. the active HS-DSCH cell.

In some embodiments, wherein the measurement control message comprises a set of candidate multipoint cells as previously described and wherein the measurement control message comprises one or more of the measurements quantities, threshold, hysteresis, time to trigger, the user equipment 30 further determines when the second cell 22 is better than the first cell 21 by performing at least one measurement in accordance with the measurement control message.

Action 1303

The user equipment 30 transmits a measurement report to the radio network controller 10, whereby the radio network controller 10 selects the second cell 22, i.e. the active non HS-DSCH cell, to become an active HS-DSCH cell and to be one of the two or more cells 21,22 for simultaneous transmission of data to the user equipment 30.

In some embodiments, the measurement report is an intra-frequency report indicating to the radio network controller 10 that the second cell 22, i.e. the active non HS-DSCH cell, has become better than the first cell 21, i.e. the active HS-DSCH cell. The intra-frequency report may be an event 1K report.

However, the measurement report may be an inter-frequency report indicating to the radio network controller 10 that the second cell 22, i.e. the active non HS-DSCH cell, has become better than the first cell 21, i.e. the active HS-DSCH cell. In some embodiments, the inter-frequency report is an 8A report that is event-triggered. Further, the inter-frequency report may be a periodic report.

Figure 14:
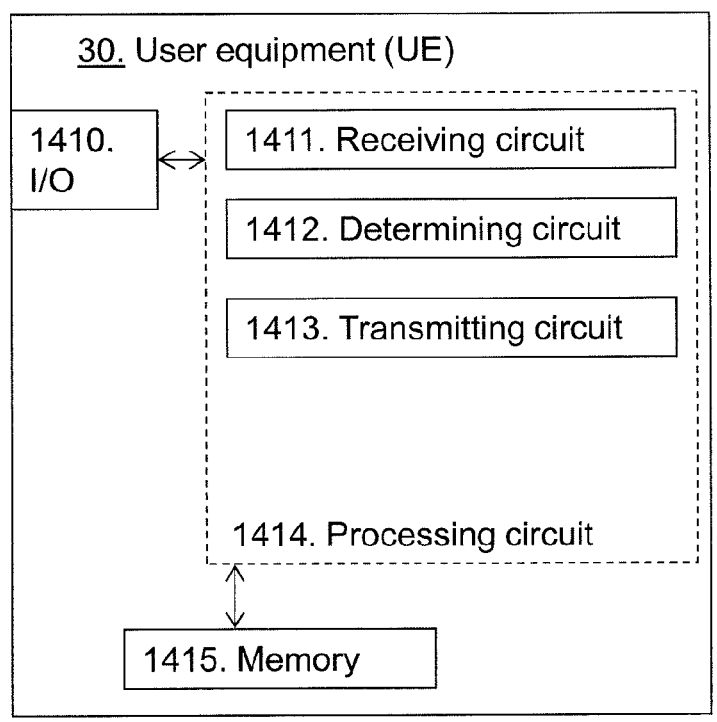
FIG. 14 is a schematic block diagram illustrating embodiments of a user equipment.

To perform the method actions in the user equipment 30 described above in relation to FIG. 13, the user equipment 30 comprises the following arrangement depicted in FIG. 14. The user equipment 30 is configured to assist a radio network controller 10 in selecting two or more cells 21,22 for simultaneous transmission of data to the user equipment 30 by at least one radio network node 20 controlling the two or more cells 21,22, which user equipment 30 is capable of Multi Point High Speed Downlink Packet Access, MP-HSDPA, transmissions.

As previously mentioned, the user equipment 30 is capable of MP-HSDPA transmissions. Further, the radio network controller 10, the radio network node 20, the cells 21,22 and the user equipment 30 are comprised in the communications network 100.

The user equipment 30 comprises an input and output interface 1410 configured to function as an interface for communication in the communications network 100. The communication may for example be communication with the radio network controller 10 and/or the radio network node 20.

The user equipment 30 comprises further a receiving circuit 1411 configured to receive a measurement control message from the radio network controller 10.

A determining circuit 1412 is further comprised in the user equipment 30. The determining circuit 1412 is configured to determine, based on the received measurement control message, when the second cell 22, i.e. the active non HS-DSCH cell, has a better signal quality than the first cell 21, i.e. the active HS-DSCH cell.

In some embodiments, the measurement control message may comprise a set of candidate multipoint cells. The set may comprise one or more first cells 21 that are active HS-DSCH cells and/or one or more second cells 22 that are active non HS-DSCH cells for which cells 21,22 the user equipment 30 shall perform the measurements. The measurement control message may further comprise one or more of the measurements quantities, threshold, hysteresis, and time to trigger. In such embodiments, the determining circuit 1412 is further configured to determine when second cell 22 is better than the first cell 21 by performing at least one measurement in accordance with the measurement control message.

Further, the user equipment 30 comprises a transmitting circuit 1413 configured to transmit a measurement report to the radio network controller 10. Thereby the radio network controller 10 may select the second cell 22, i.e. the active non HS-DSCH cell, to become an active HS-DSCH cell and to be one of the two or more cells 21,22 for simultaneous transmission of data to the user equipment 30.

In some embodiments, the measurement report is an intra-frequency report indicating to the radio network controller 10 that the second cell 22, i.e. the active non HS-DSCH cell, has become better than the first cell 21, i.e. the active HS-DSCH cell.

However, as previously mentioned, the measurement report may be an inter-frequency report indicating to the radio network controller 10 that the second cell 22 has become better than the first cell 21. In some embodiments, the inter-frequency report is an 8A report that is event-triggered. Further, the inter-frequency report may be a periodic report.

Embodiments herein for assisting a radio network controller 10 in selecting two or more cells 21,22 for simultaneous transmission of data to the user equipment 30 by at least one radio network node 20 controlling the two or more cells 21,22 may be implemented through one or more processors, such as a processing circuit 1414 in the arrangement depicted in FIG. 14, together with computer program code for performing the functions and/or method actions of embodiments herein.

It should be understood that one or more of the circuits comprised in the user equipment 30 described above may be integrated with each other to form an integrated circuit.

The computer program code mentioned above may also be provided as a computer program product, for instance in the form of a data carrier carrying computer program code for performing the embodiments herein when being loaded into the user equipment 30. One such carrier may be in the form of a CD or DVD. It is however feasible with other data carriers such as a memory stick, memory card or hard drive. The computer program code may furthermore be provided as pure program code on a server for download to the user equipment 30. The computer program code may furthermore be provided in the form of a data file or files on, or available through, a server for download. The file or files may be executable files for direct or indirect download to and execution on the user equipment 30, or may be for intermediate download and compilation to make them executable before download to and for execution on the user equipment 30. The server may be accessible over a computer network, such as the Internet, and may e.g. be a web or ftp server.

Those skilled in the art will also appreciate that the input output interface 1410, the receiving circuit 1411, a determining circuit 1412 and the transmitting circuit 1413 may refer to a combination of analog and digital circuits, and/or one or more processors configured with software and/or firmware (e.g., stored in memory) that, when executed by the one or more processors such as the processing circuit 1414, perform as described above. One or more of these processors, as well as the other digital hardware, may be included in a single Application-Specific Integrated Circuit (ASIC), or several processors and various digital hardware may be distributed among several separate components, whether individually packaged or assembled into a system-on-a-chip (SoC).

The user equipment 30 may further comprise a memory 1415. The memory 1415 may comprise one or more memory units and may be used to store for example data such as information relating to the radio network controller and radio network nodes, etc.

Figure 15:
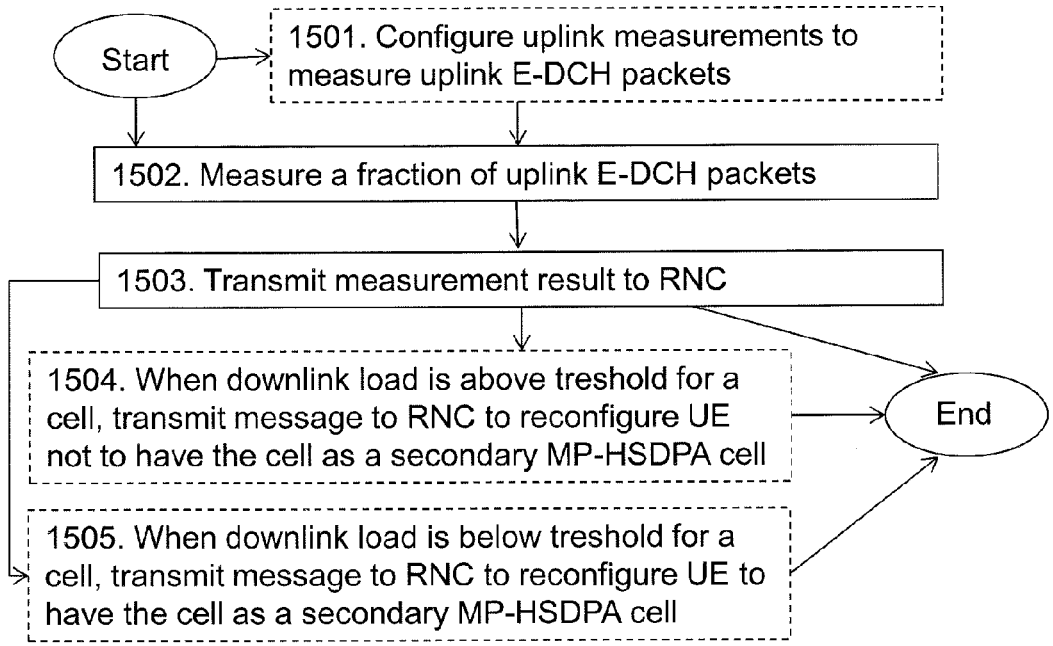
FIG. 15 is a flowchart depicting embodiments of a method in a radio network node.

A method in a radio network node 20 for assisting a radio network controller 10 for selecting two or more cells 21,22 for simultaneous transmission of data to the user equipment 30 by at least one radio network node 20 controlling the two or more cells 21,22 will now be described with reference to FIG. 15. The actions do also relates to FIG. 21 which will be described further below.

As previously mentioned, the user equipment 30 is capable of MP-HSDPA transmissions. Further, the radio network controller 10, the radio network node 20, the cells 21,22 and the user equipment 30 are comprised in the communications network 100.

The method comprises the following actions, which actions do not have to be performed in the order stated below, but may be taken in any suitable order. Further, actions may be combined. Optional actions are indicated by dashed boxes.

Action 1501

In some embodiments, the radio network node 20 configures uplink measurements to perform the measurement of the uplink E-DCH packets.

Action 1502

The radio network node 20 measures a fraction of uplink Enhanced Dedicated Channel, E-DCH, packets transmitted from the user equipment 30 and received at a radio network node 20.

Action 1503

The radio network node 20 transmits a measurement result to the radio network controller 10. Thereby the radio network controller 10 reconfigures the radio network node 20 controlling the second cell 22, i.e. the active non HS-DSCH cell, such that the second cell 22 becomes an active HS-DSCH cell and is one of the two or more cells 21,22 for simultaneous transmission of data to the user equipment 30.

Action 1504

In some embodiments, when, for a cell that is comprised in the two or more cells 21,22 for simultaneous transmission of data to the user equipment 30, a downlink load is higher than a threshold, the radio network node 20 transmits a message to the radio network controller 10 to reconfigure the user equipment 30 not to have the cell as a secondary MP-HSDPA cell.

For example, in FIG. 10*a*, the third cell 23 may be considered as a primary, i.e. serving, MP-HSDPA cell for the user equipment 30, and the first cell 21 may be considered to be a secondary MP-HSDPA cell. Further, as described above, the first cell 21 may be replaced by the second cell 22.

When using the expression "secondary MP-HSDPA cell" herein is meant an assisting serving MP-HSDPA cell, which cell is on a same frequency as the primary, i.e. the serving, MP-HSDPA cell.

Action 1505

As an alternative to Action 1504, in some embodiments, when, for a cell that is comprised in the two or more cells 21,22 for simultaneous transmission of data to the user equipment 30, a downlink load is lower than a threshold, the radio network node 20 transmits a message to the radio network controller 10 to reconfigure the user equipment 30 to have the cell as a secondary MP-HSDPA cell.

The downlink load mentioned in Actions 1504 and 1505, may be measured as the number of user equipments 31 configured for HS-DSCH reception, average power utilization in the cell, or the fraction of Transmission Timing Intervals, TTIs, in which data is scheduled.

Figure 16:
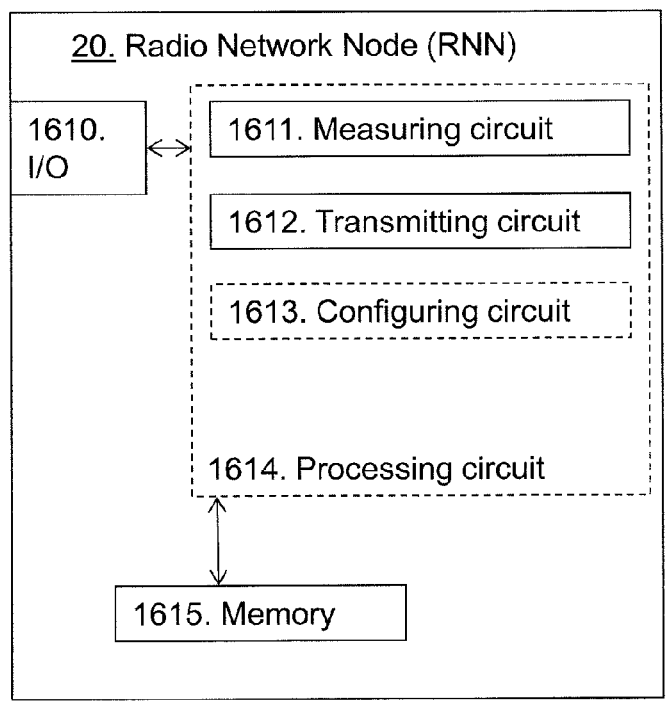
FIG. 16 is a schematic block diagram illustrating embodiments of a radio network node.

To perform the method actions in the radio network node 20 described above in relation to FIG. 15, the radio network node 20 comprises the following arrangement depicted in FIG. 16. The radio network node 20 is configured to assist a radio network controller 10 in selecting two or more cells 21,22 for simultaneous transmission of data to the user equipment 30 by at least one radio network node 20 controlling the two or more cells 21,22, which user equipment 30 is capable of Multi Point High Speed Downlink Packet Access, MP-HSDPA, transmissions.

As previously mentioned, the user equipment 30 is capable of MP-HSDPA transmissions. Further, the radio network controller 10, the radio network node 20, the cells 21,22 and the user equipment 30 are comprised in the communications network 100.

The radio network node 20 comprises an input and output interface 1610 configured to function as an interface for communication in the communications network 100. The communication may for example be communication with the radio network controller 10 and/or the user equipment 30,31.

Further, the radio network node 20 comprises a measuring circuit 1611 configured to measure a fraction of uplink Enhanced Dedicated Channel, E-DCH, packets transmitted from the user equipment 30 and received at a radio network node 20.

A transmitting circuit 1612 is further comprised in the radio network node 20. The transmitting circuit 1612 is configured to transmit a measurement result to the radio network controller 10, whereby the radio network controller 10 reconfigures the radio network node 20 controlling the second cell 22, i.e. the active non HS-DSCH cell, such that the second cell 22 becomes an active HS-DSCH cell and is one of the two or more cells 21,22 for simultaneous transmission of data to the user equipment 30.

In some embodiments, the transmitting circuit 1612 is further configured to transmit a message to the radio network controller 10 to reconfigure the user equipment 30 not to have a cell that is comprised in the two or more cells 21,22 for simultaneous transmission of data to the user equipment 30 as a secondary MP-HSDPA cell. This may be the case when for example when a downlink load for that cell is higher than a threshold.

Further, the transmitting circuit 1612 may be configured to transmit a message to the radio network controller 10 to reconfigure the user equipment 30 to have a cell that is comprised in the two or more cells 21,22 for simultaneous transmission of data to the user equipment 30 as a secondary MP-HSDPA cell. This may for example be the case when a downlink load for that cell is lower than a threshold.

The downlink load may be measured as a number of user equipments 31 configured for HS-DSCH reception, an average power utilization in the cell, or a fraction of Transmission Timing Intervals, TTIs, in which data is scheduled.

In some embodiments, the radio network node 20 further comprises a configuring circuit 1613 configured to configure uplink measurements to perform the measurement of the uplink E-DCH packets.

Embodiments herein for assisting a radio network controller 10 in selecting two or more cells 21,22 for simultaneous transmission of data to the user equipment 30 by at least one radio network node 20 controlling the two or more cells 21,22 may be implemented through one or more processors, such as a processing circuit 1614 in the arrangement depicted in FIG. 16, together with computer program code for performing the functions and/or method actions of embodiments herein.

It should be understood that one or more of the circuits comprised in the radio network node 20 described above may be integrated with each other to form an integrated circuit.

The computer program code mentioned above may also be provided as a computer program product, for instance in the form of a data carrier carrying computer program code for performing the embodiments herein when being loaded into the radio network node 20. One such carrier may be in the form of a CD or DVD. It is however feasible with other data carriers such as a memory stick, memory card or hard drive. The computer program code may furthermore be provided as pure program code on a server for download to radio network node 20. The computer program code may furthermore be provided in the form of a data file or files on, or available through, a server for download. The file or files may be executable files for direct or indirect download to and execution on the user equipment 30, or may be for intermediate download and compilation to make them executable before download to and for execution on the radio network node 20. The server may be accessible over a computer network, such as the Internet, and may e.g. be a web or ftp server.

Those skilled in the art will also appreciate that the input output interface 1610, the measuring circuit 1611, the transmitting circuit 1612, and the configuring circuit 1613 may refer to a combination of analog and digital circuits, and/or one or more processors configured with software and/or firmware (e.g., stored in memory) that, when executed by the one or more processors such as the processing circuit 1614, perform as described above. One or more of these processors, as well as the other digital hardware, may be included in a single Application-Specific Integrated Circuit (ASIC), or several processors and various digital hardware may be distributed among several separate components, whether individually packaged or assembled into a system-on-a-chip (SoC).

The radio network node 20 may further comprise a memory 1615. The memory 1615 may comprise one or more memory units and may be used to store for example data such as information relating to the radio network controller and radio network nodes, etc.

Figure 17:
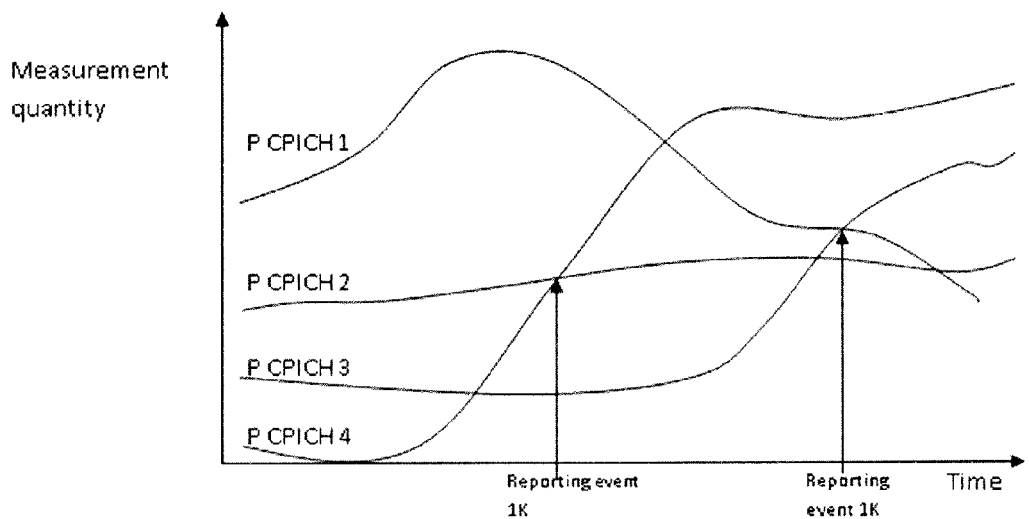
FIG. 17 is a graph of an example where a report event 1K occurs twice over time.

In some embodiments, a new user equipment measurement event (Event 1K) is defined. This relates to Action 1102a described above. FIG. 17 is a graph of an example where a report event 1K occurs twice over time.

The user equipment 30 informs, e.g., via RRC signaling, a radio network node, e.g., the RNC 10, when a cell that is not carrying HS-DSCH channel but belongs to the UE's active set becomes better than any (at least one) cell that carries the HS-DSCH channel. This may also be expressed as the user equipment 30 informs the radio network controller 10, when an active non HS-DSCH cell becomes better than an active HS-DSCH cell. For example, it relates to the Actions 1302 and 1303 described above. The radio network node may be a base station, a control node, etc. For purpose of this non-limiting example, the radio network node is assumed to be an RNC 10. The measurement procedures may be configured and initialized by the RNC 10 using for example an RRC "Measurement Control" message (cf. e.g. Action 1101a described above) that includes (1) a list of candidate multi-point cells for which the user equipment 30 is to perform the measurements, (2) measurement quantities, (3) one or more thresholds, (4) hysteresis, (5) time to trigger, etc. This relates to Action 1101a described above.

Figure 18:
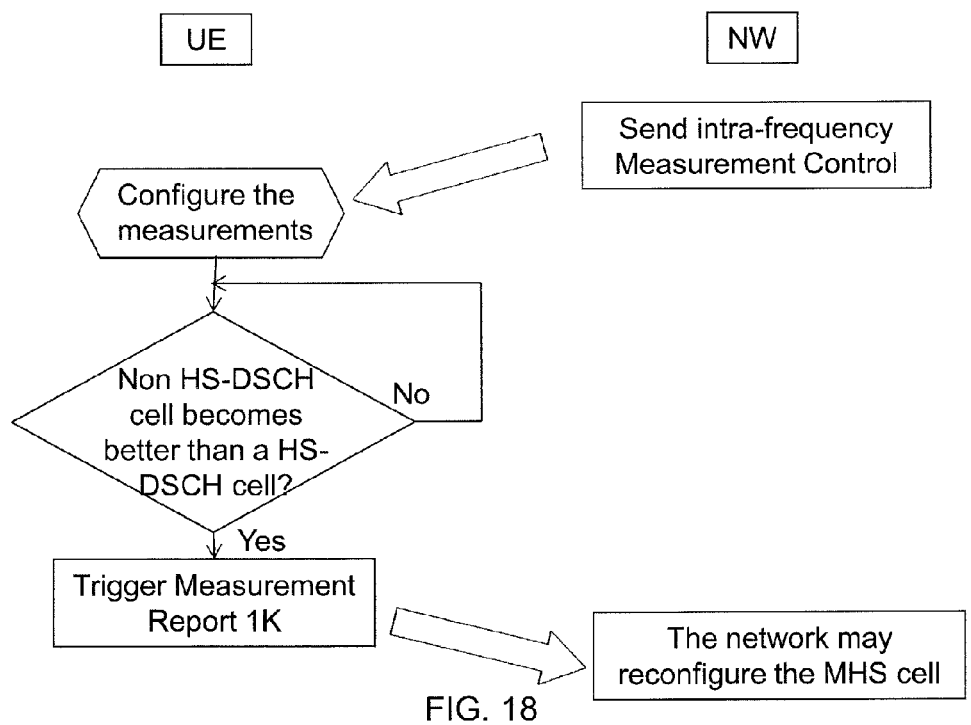
FIG. 18 is a schematic flowchart with example actions of a user equipment and a network node comprised in a communications network.

FIG. 18 is a flowchart with example steps for the user equipment 30 and a network node 10 in the network (NW) in accordance with some embodiments. This relates to e.g. the Actions described above with reference to the FIGS. 11 and 13.

The Measurement Control message might be defined by the RNC based on different criteria including (1) cell load (e.g. average flow control queue length, number of HS-DSCH users etc.), and (2) a base station's (e.g., NodeB's) transmit power (the RNC may decide to exclude from the Measurement Control cells belonging to NodeBs with different transmit powers as compared to the power of the serving NodeB). This relates to e.g. Action 1101a described above. A non-limiting example of a potential measurement control configuration for Event 1K is provided below:

| MEASUREMENT CONTROL - EVENT 1K - Measurement Identify '14' and '15' | |
|---|---|
| Information Element | Presence Value/Value range |
| Message Type | |
| UE Information Elements | |
| RRC transaction identifier | Present (MP) Integer [0 . . . 3] |
| Integrity check info | Conditional (CH) |
| > Message authentication code | Present (MP) Bit string (32) |
| > RRC Message sequence number | Present (MP) Integer [0 . . . 15] |
| Measurement Information elements | |
| Measurement Identity | Present (MP) |
| > Measurement Identity | Present (MP) [14, 15] |
| Measurement Command | Present (MP) |
| > Measurement Command | Present (MP) [Setup, Modify, Release] |
| Measurement Reporting Mode | Conditional (OP) |
| > Measurement Report Transfer Mode | Present (MP) [Acknowledged mode RLC, Unacknowledged mode RLC] |
| > Periodical Reporting/Event Trigger Reporting Mode | Present (MP) [Periodical reporting, Event trigger] |
| Multipoint HS-DSCH cell info list | Present (MP) |
| > CHOICE Multipoint HS-DSCH cell removal | Conditional (OP) |
| 2> Remove all Multipoint HS-DSCH cells | |
| 2> Remove some Multipoint HS-DSCH cells | |
| 3> Removed Multipoint HS-DSCH cells | Present (MP) 1 up to 16 iterations |
| 4> Multipoint HS-DSCH cell id | Present (MP) Integer (0 . . . 31) |
| > New Multipoint HS-DSCH cells | Conditional (OP) 1 up to 16 iterations |

-continued

MEASUREMENT CONTROL - EVENT 1K - Measurement Identify '14' and '15'

| Information Element | Presence Value/Value range |
|---|---|
| 2> Multipoint HS-DSCH cell id | Present (MD) Integer (0 . . . 31) |
| > Multipoint HS-DSCH measurement quantity | Conditional (OP) |
| 2> Filter coefficient | Present (MP) |
| 3> Filter coefficient | Conditional (MD) [0, 1, 2, 3, 4, 5, 6, 7, 8, 9, 11, 13, 15, 17, 19] |
| 3> CHOICE mode | Present (MP) FDD |
| 4> Measurement quantity | Present (MP) [CPICH Ec/NO, CPICH RSCP, pathloss] |
| > Multipoint HS-DSCH reporting quantity | Conditional (OP) |
| 2> CPICH Ec/N0 reporting indicator | Present (MP) TRUE, FALSE |
| 2> CPICH RSCP reporting indicator | Present (MP) TRUE, FALSE |
| 2> Pathloss reporting indicator | Present (MP) TRUE, FALSE |
| 2> Multipoint HS-DSCH measurement reporting criteria | |
| 4> Hysteresis | Present (MP) [0 . . . 7.5 by step of 0.5] In dB |
| 4> Time to trigger | Present (MP) [0, 10, 20, 40, 60, 80, 100, 120, 160, 200, 240, 320, 640, 1280, 2560, 5000] In ms |
| 4> Amount of reporting | Conditional (CV) [1, 2, 4, 8, 16, 32, 64, Infinity] |
| 4> Reporting interval | Conditional (CV) [0, 250, 500, 1000, 2000, 4000, 8000, 16000] In ms |
| 2> Periodical reporting criteria | |
| 3> Amount of reporting | Conditional (MD) 2 |
| 3> Reporting interval | Present (MP) [0, 250, 500, 1000, 2000, 4000, 8000, 16000] In ms |
| > Maximum number of reported cells. | Present (MP) Integer (1 . . . 6) |

Figures 19A, 19B:
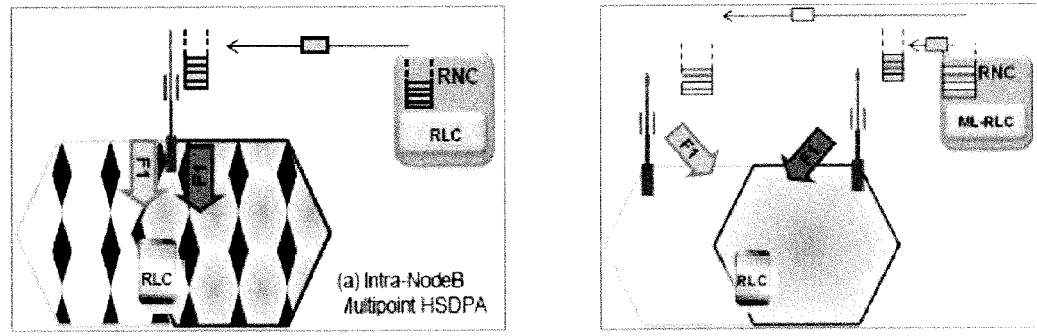
FIGS. 19a and 19b schematically illustrates intra-NodeB and inter-NodeB Multipoint HSDPA operation.

The new event 1K is not limited to the change of a single best cell but provides for a second-best cell, a third-best cell, etc. This new event 1K solution is applicable for both intra-NodeB and inter-NodeB Multipoint HSDPA operation, where the same frequencies assumed. Intra-NodeB and inter-NodeB Multipoint HSDPA operation are illustrated conceptually in FIGS. 19a and 19b, respectively.

A limitation with this example approach is that it only covers intra-frequency measurements, and does not cover the case where downlink HS-DSCH transmissions may take place from two different Node-Bs or cells on different frequencies, i.e., inter-frequency measurements. In other words, existing user equipment measurement methods are not suitable for simultaneous measurements and comparison of cells belonging to two different frequencies. Accordingly, some embodiments will now be described that overcomes this issue. A new category of reporting events is provided that allows user equipment measurements and event-triggered or periodic reports on a combined list of cells belonging to different frequencies. An illustration is shown in Table 1 shown below where the user equipment compares the quality of cell-w and cell-x on frequency 1 with the quality of cell-y and cell-z on frequency 2, with cell-y and cell-z not necessarily belonging to the same Node-Bs as cell-w and cell-x. This also relates to Actions described above with reference to the FIGS. 11 and 13.

Figure 20:
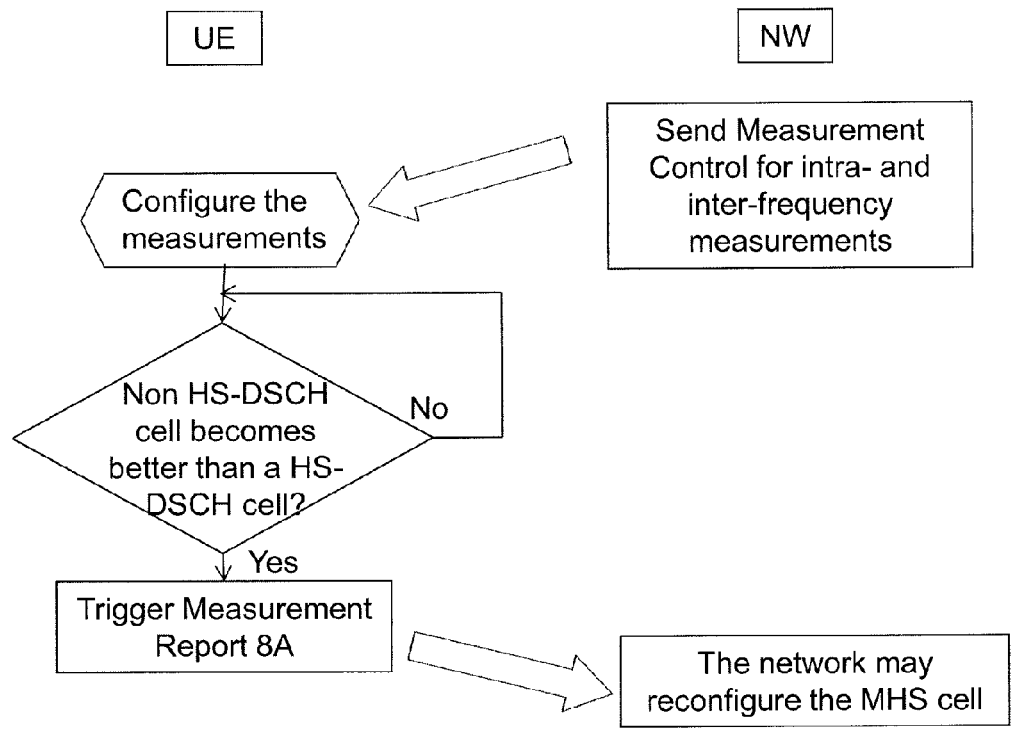
FIG. 20 is a schematic flowchart with example actions of a user equipment and a network node comprised in a communications network.
Figure 21:
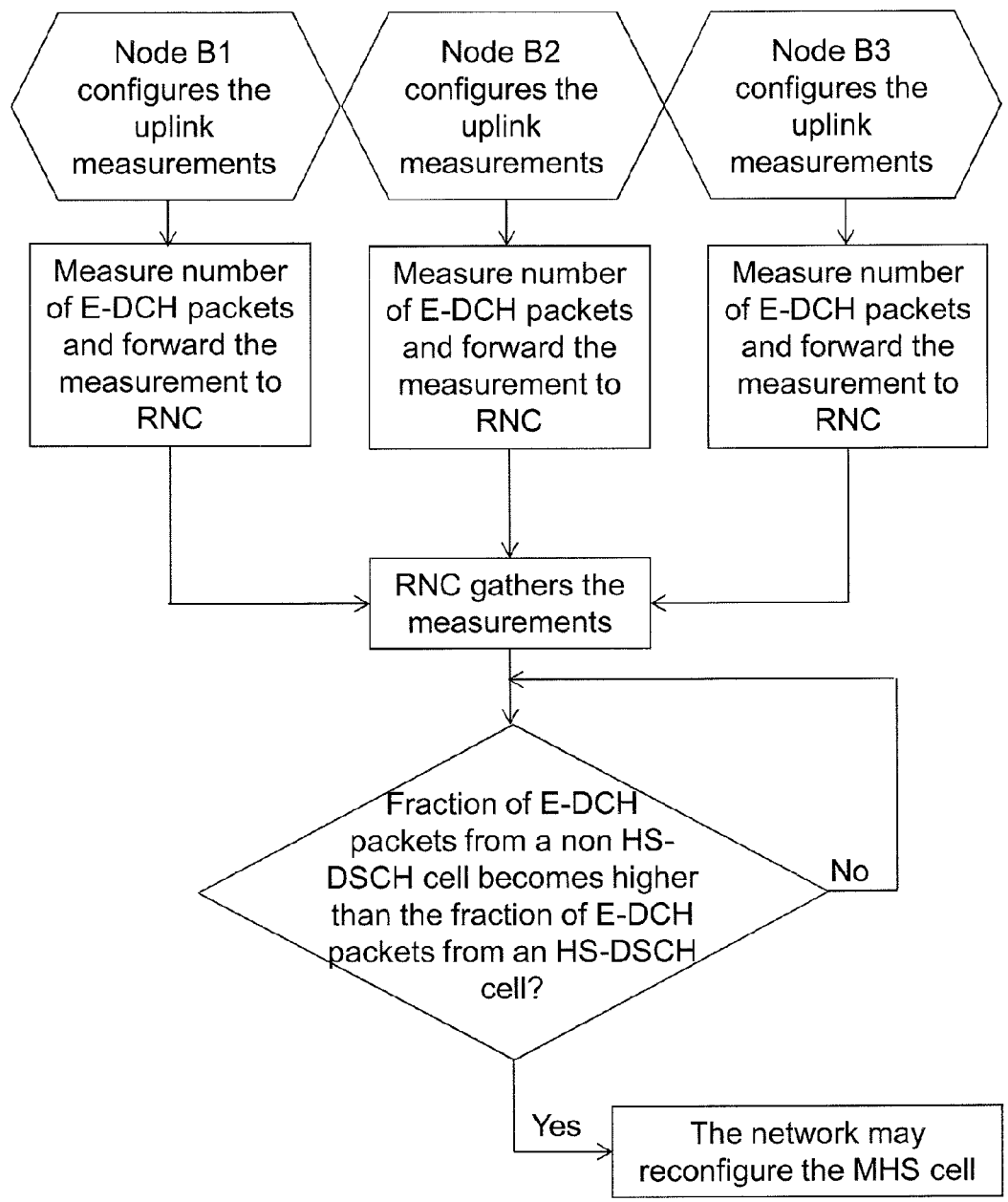
FIG. 21 is a schematic flowchart of network-based MP-HSDPA mobility management.

FIG. 20 is a flowchart with example steps for the user equipment and a network node in the network (NW) in accordance with the second embodiment.

This method is applicable to scenarios with multiple frequencies. For simplicity, in the following example, the user equipment is configured with two downlink frequencies.

TABLE 1

Illustration of the Ec/No and RSCP measurements for the cells on the two frequencies.

| | Frequency 1 | | | Frequency 2 | |
|---|---|---|---|---|---|
| | EcNo | RSCP | | EcNo | RSCP |
| Cell-w | −4 dB | −80 dBm | Cell-y | −7 dB | −85 dBm |
| Cell-x | −8 dB | −90 dBm | Cell-z | −10 dB | −100 dBm |

The measurement procedures may be configured and initialized by the network. For example, in a 3G type system, the RNC may perform this functionality as per the existing categories 1-7 using known RRC "Measurement Control" and "Measurement Report" messages. The Measurement Control configuring the measurement would include a list of candidate multipoint cells to be measured (e.g., ordered per frequency), the measurement quantities, threshold, hysteresis, time to trigger, etc. This relates e.g. to Action 1101a described above.

A non-limiting example of potential measurement control configuration for Event 8A is set for below:

MEASUREMENT CONTROL - EVENT 8A - Measurement Identify '16' and '17'

| Information Element | Presence Value/Value range |
|---|---|
| Message Type | |
| UE Information Elements | |
| RRC transaction identifier | Present (MP) Integer [0 . . . 3] |
| Integrity check info | Conditional (CH) |
| > Message authentication code | Present (MP) Bit string (32) |
| > RRC Message sequence number | Present (MP) Integer [0 . . . 15] |
| Measurement Information elements | |
| Measurement Identity | Present (MP) |
| > Measurement Identity | Present (MP) [16, 17] |
| Measurement Command | Present (MP) |
| > Measurement Command | Present (MP) [Setup, Modify, Release] |
| Measurement Reporting Mode | Conditional (OP) |
| > Measurement Report Transfer Mode | Present (MP) [Acknowledged mode RLC, Unacknowledged mode RLC] |
| > Periodical Reporting/Event Trigger Reporting Mode | Present (MP) [Periodical reporting, Event trigger] |
| Multipoint HS-DSCH cell info list | Present (MP) |
| > CHOICE Multipoint HS-DSCH cell removal | Conditional (OP) |

| MEASUREMENT CONTROL - EVENT 8A - Measurement Identify '16' and '17' | |
|---|---|
| Information Element | Presence Value/Value range |
| 2> Remove all Multipoint HS-DSCH cells | |
| 2> Remove some Multipoint HS-DSCH cells | |
| 3> Removed Multipoint HS-DSCH cells | Present (MP) 1 up to 16 iterations |
| 4> Multipoint HS-DSCH cell id | Present (MP) Integer (0 . . . 31) |
| > New Multipoint HS-DSCH cells | Conditional (OP) 1 up to 16 iterations |
| 2> Multipoint HS-DSCH cell id | Present (MD) Integer (0 . . . 31) |
| 3> Frequency info | Conditional (OP) |
| 4> CHOICE Mode | Present (MD) FDD |
| 5> UARFCN uplink (Nu) | Conditional (OP) [0 . . . 16383] |
| 5> UARFCN downlink (Nd) | Present (MP) [0 . . . 16383] |
| 4> Cell individual offset | Present (MD) [−10.0 . . . 10.0 dB by step of 0.5 dB] |
| 4> CHOICE mode | Present (MP) FDD |
| 5> Primary CPICH info | Present (OP) |
| 6> Primary scrambling code | Present (MP) [0 . . . 511] |
| 5> Primary CPICH TX power | Conditional (OP) |
| 5> TX Diversity Indicator | Present (MP) Boolean |
| > Multipoint HS-DSCH measurement quantity | Conditional (OP) |
| 2> Filter coefficient | Present (MP) |
| 3> Filter coefficient | Conditional (MD) [0, 1, 2, 3, 4, 5, 6, 7, 8, 9, 11, 13, 15, 17, 19] |
| 3> CHOICE mode | Present (MP) FDD |
| 4> Measurement quantity | Present (MP) [CPICH Ec/NO, CPICH RSCP, pathloss] |
| > Multipoint HS-DSCH reporting quantity | Conditional (OP) |
| 2> CPICH Ec/N0 reporting indicator | Present (MP) TRUE, FALSE |
| 2> CPICH RSCP reporting indicator | Present (MP) TRUE, FALSE |
| 2> Pathloss reporting indicator | Present (MP) TRUE, FALSE |
| 2> Multipoint HS-DSCH measurement reporting criteria | |
| 4> Reporting range constant | Conditional (CV) [0 . . . 14.5 by step of 0.5] In dB |
| 4> Hysteresis | Present (MP) [0 . . . 7.5 by step of 0.5] In dB |
| 4> Time to trigger | Present (MP) [0, 10, 20, 40, 60, 80, 100, 120, 160, 200, 240, 320, 640, 1280, 2560, 5000] In ms |
| 4> Amount of reporting | Conditional (CV) [1, 2, 4, 8, 16, 32, 64, Infinity] |
| 4> Reporting interval | Conditional (CV) [0, 250, 500, 1000, 2000, 4000, 8000, 16000] In ms |
| 2> Periodical reporting criteria | |
| 3> Amount of reporting | Conditional (MD) 2 |
| 3> Reporting interval | Present (MP) [0, 250, 500, 1000, 2000, 4000, 8000, 16000] In ms |
| > Maximum number of reported cells. | Present (MP) Integer (1 . . . 6) |

As soon as any non-HS-DSCH cell becomes better, e.g., in terms of Ec/No, than any HS-DSCH cell on one of the two frequencies, an event is triggered. In the Measurement Report, the user equipment may (depending on the configuration in the Measurement Control), report not only the values of the cells that triggered the event, but also the measurement values of all the candidate cells in the RRC Measurement Control message. This relates to e.g. the Action 1102a and Action 1303 described.

NETWORK-BASED MP-HSDPA MOBILITY MANAGEMENT. The embodiments described above are based on the user equipment performing measurements and new rules, e.g. events, that control when the user equipment reports these measurements to the network.

The following describes example embodiments where the network reuses existing information, i.e., information that is already available in the network for other purposes, for evaluating the quality of different downlink cells in the active set of a user equipment for each configured frequency for MP-HSDPA transmission. See e.g. the flowchart in FIG. 21. All these subsequent embodiments estimate the downlink quality based on a quality associated with the uplink, which means that downlink radio links are evaluated for which the user equipment has a corresponding uplink configured.

In one non-limiting example embodiment, each base station, e.g., Node-B, in a user equipment's active set monitors the fraction of uplink Enhanced Dedicated Channel (E-DCH) packets that it receives successfully. This relates to e.g. the Action 1502 described above. For each Node-B, the reception of an E-DCH packet is either classified "successfully received" if the Node-B may decode the packet (and it would consequently send an ACK on the E-DCH HARQ Acknowledgement Indicator Channel (E-HICH)). In a variation of this embodiment, a Node-B that does not belong to the user equipment's active set may compute an estimate of uplink quality by decoding the E-DCH packets transmitted on the Enhanced-Dedicated Physical Data Channel (E-DPDCH). A Node-B that does not belong to the active set may not respond on the E-HICH to the user equipment. To enable a Node-B that does not belong to the active set, the RNC informs that Node-B about, e.g., the scrambling code used by the user equipment required for decoding, etc. Regardless of whether the Node-B belongs to the active set, the Node-B may, based on the fraction of uplink packets it received successfully, form an estimate of the relative uplink quality with respect to the other radio links. For example, if a certain Node-B receives more that x>50% of the uplink E-DCH packets successfully, then this is good indication that the uplink quality of this link is of equal strength as the currently serving HS-DSCH cell. Thus, if the fraction of E-DCH packets that a Node-B receives successfully exceeds a certain threshold (possibly during a certain time period) and the Node-B is capable of MP-HSDPA, then this Node-B may inform the RNC that its link quality exceeds a certain level. Similarly, if a Node-B is configured as a secondary MP-HSDPA cell to a particular user equipment and the fraction of E-DCH packets that it receives is smaller than a certain threshold (possibly during a certain time-period), then the Node-B may send a message indicating this to the RNC over NBAP.

In addition to the uplink link quality, a network node may also account for Node-B static specific parameters, such as that different Node-Bs have different transmit powers by, e.g., using a higher threshold value x for sending the NBAP message to the RNC. Note also that the thresholds and the time-duration during which the link quality must exceed the threshold used by the Node-B either could be signaled by the RNC or be Node-B implementation.

In addition, the path gain (path loss) and the transmit power of the Node-B may also account for the current downlink load in the cell. For example, if the downlink load is high in a cell and there are user equipments that have this cell configured as a secondary MP-HSDPA cell, then the Node-B may send a NBAP message suggesting to the RNC that the UE should be reconfigured so that it does not have the specific cell as its secondary MP-HSDPA cell. In a similar fashion, the Node-B may only send a message to the RNC requesting it to add the cell as a secondary MP-HSDPA cell if the downlink load is below a certain threshold. The downlink load may be measured as the number of configured user equipments, the average power utilization in the cell, or the fraction of TTIs in which data is scheduled.

This relates to the Actions described above with reference to FIG. 15.

In other non-limiting example embodiments, the RNC 10 estimates the downlink quality associated with the different cells 21,22 by monitoring the fraction of RLC packets it receives from the cells 21,22 in the active set. By comparing the fraction of RLC packets received from each cell, the RNC estimates the relative uplink quality associated with the different cells. For example, if a majority of uplink RLC packets is received from one cell, then this indicates that the uplink link quality of this cell is the best one among the cells in the active set. One benefit of this embodiment, as compared to the embodiment described above, is that it does not require the UE to be configured with an E-DCH. Another benefit is that no new NBAP message from the Node-B to the RNC needs to be introduced.

Similar to the example embodiment described above, the RNC may account for relative differences in transmit power as well as downlink load, which is available to the RNC, e.g., by bit rate measurements. The RNC may also, by determining to which Node-B a certain RLC packet was forwarded, keep track of the fraction of RLC retransmissions that occur from the two different base station sites. If the number of RLC retransmissions associated with a secondary MP-HSDPA exceeds a certain threshold, then this may an indication by the RNC that the downlink quality associated with this cell is inferior, and thus, trigger a reconfiguration.

This relates to the Actions described above with reference to FIG. 11, and especially to the Actions 1101c, 1102c, 1103c and 1104.

Although the description above contains many specifics, they should not be construed as limiting but as merely providing illustrations of some presently preferred embodiments. For example, non-limiting, example embodiments of the technology were described in an LTE context. But the principles of the technology described may also be applied to other radio access technologies. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method by a Radio Network Controller (RNC) associated with one or more radio nodes controlling a set of cells that are candidates for use in Multi-Point High Speed Downlink Packet Access (MP-HSDPA) transmission to a user equipment, the method comprising:
   receiving indications of the fraction of uplink Enhanced Dedicated Channel (E-DCH) or uplink Radio Link Control (RLC) packets that are successfully received from the user equipment in respective ones of the set of cells, wherein the indications received for any given one of the respective cells is an indication that the fraction of uplink E-DCH or RLC packets successfully received from the user equipment at the radio node associated with the given cell exceeds a configured threshold;
   estimating relative uplink qualities of the respective cells, based on the indicated fractions;
   controlling which cells among the set of cells that are active for MP-HSDPA transmissions to the user equipment, based on the estimated relative uplink qualities; and
   sending signaling to the associated radio node to set the configured threshold in dependence on at least one of a downlink load of the given cell and a downlink transmit power of the given cell.

2. The method of claim 1, wherein receiving the indications for a given one of the respective cells comprises receiving an indication from a radio node associated with the given cell.

3. The method of claim 2, wherein receiving the indication from the radio node associated with the given cell comprises receiving an indication that the fraction of uplink E-DCH or RLC packets successfully received from the user equipment at the radio node exceeds a configured threshold.

4. The method of claim 3, further comprising determining a value of the configured threshold, as used at the radio node, in dependence on a downlink transmit power at the radio node for the given cell, such that the radio node uses a higher-valued configured threshold for higher downlink transmit powers and a lower-valued configured threshold for lower downlink transmit powers.

5. The method of claim 1, further comprising the RNC sending signaling to the radio node to configure a time period over which the fraction is determined.

6. The method of claim 1, further comprising, for a given one of the respective cells that is not in an active set used for soft handover of the user equipment, sending signaling from the RNC to a radio node associated with the given cell, said signaling indicating a scrambling code used by the user equipment for transmitting uplink E-DCH packets, to thereby enable the radio node associated with the given cell to decode the uplink E-DCH packets transmitted by the user equipment and thereby estimate the fraction of uplink E-DCH packets successfully received from the user equipment in the given cell.

7. The method of claim 1,
wherein receiving the indications of the fraction of uplink E-DCH or RLC packets that are successfully received from the user equipment in respective ones of the cells comprises receiving an indication for a first cell that is active for MP-HSDPA transmissions to the user equipment, and receiving an indication for a second cell that is not active for MP-HSDPA transmissions to the user equipment,
wherein estimating the relative uplink qualities of the respective cells comprises estimating from the indications received from the first and second cells whether the uplink quality of the second cell exceeds the uplink quality of the first cell, and
wherein controlling which cells among the set of cells that are active for MP-HSDPA transmissions to the user equipment comprises sending signaling to configure the second cell to be active for MP-HSDPA transmissions to the user equipment, in response to determining that the uplink quality of the second cell exceeds the uplink quality of the first cell.

8. The method of claim 1, wherein the set of cells comprises an active set of cells for soft handover of the user equipment, and wherein receiving the indications of the fraction of uplink E-DCH or RLC packets that are successfully received from the user equipment in respective ones of the cells comprises the RNC monitoring, via said indications, the fraction of uplink RLC packets successfully received from the user equipment in respective ones of the cells in the active set, and wherein estimating the relative uplink qualities of the respective cells comprises estimating the relative uplink qualities of the cells in the active set based on comparing the fractions of uplink RLC packets successfully received in respective ones of the cells in the active set.

9. The method of claim 1,
wherein the set of cells comprises an active set of cells for soft handover of the user equipment,
wherein receiving the indications of the fraction of uplink E-DCH or RLC packets that are successfully received from the user equipment in respective ones of the cells comprises the RNC monitoring, via said indications, the fraction of uplink RLC packets successfully received from the user equipment in a first cell in the active set and monitoring the fraction of uplink RLC packets successfully received from the user equipment in a second cell in the active set, said first cell being configured for MP-HSDPA transmissions to the user equipment and said second cell not being configured for MP-HSDPA transmissions to the user equipment,
wherein estimating the relative uplink qualities of the respective cells comprises the RNC determining that the uplink quality in the second cell exceeds the uplink quality in the first cell, responsive to determining that the fraction of uplink RLC packets successfully received from the user equipment in the second cell exceeds the fraction of uplink RLC packets successfully received from the user equipment in the first cell, and wherein controlling which cells among the set of cells that are active for MP-HSDPA transmissions to the user equipment comprises configuring the second cell for MP-HSDPA transmissions to the user equipment, in response to determining that the uplink quality in the second cell exceeds the uplink quality in the first cell.

10. A Radio Network Controller (RNC) associated with one or more radio nodes associated with a set of cells that are candidates for use in Multi-Point High Speed Downlink Packet Access (MP-HSDPA) transmission to a user equipment, said RNC comprising:
a communication interface configured to receive indications of the fraction of uplink Enhanced Dedicated Channel (E-DCH) or uplink Radio Link Control (RLC) packets that are successfully received from the user equipment in respective ones of the set of cells, wherein the indication received for any given one of the respective cells is an indication that the fraction of uplink E-DCH or RLC packets successfully received from the user equipment at the radio node associated with the given cell exceeds a configured threshold; and
a processing circuit configured to:
estimate relative uplink qualities of the respective cells, based on the indicated fractions;
control which cells among the set of cells that are active for MP-HSDPA transmissions to the user equipment, based on the estimated relative uplink qualities; and
send signaling to the associated radio node to set the configured threshold in dependence on at least one of a downlink load of the given cell and a downlink transmit power of the given cell.

11. The RNC of claim 10, wherein, for a given cell among the set of cells, the RNC is configured to receive the indications from a radio node associated with the given cell.

12. The RNC of claim 11, wherein the indications received from the radio node indicate that the fraction of uplink E-DCH or RLC packets successfully received at the radio node from the user equipment in the given cell exceeds a configured threshold.

13. The RNC of claim 12, wherein the processing circuit is configured to determine a value of the configured threshold in dependence on a downlink transmit power at the radio node for the given cell, such that the radio node uses a higher-valued configured threshold for higher downlink transmit powers and a lower-valued configured threshold for lower downlink transmit powers.

14. The RNC of claim 10, wherein the processing circuit is configured to send signaling to the radio node, to configure a time period over which the fraction is determined.

15. The RNC of claim 10, wherein the processing circuit is configured to, for a given one of the respective cells that is not in an active set of cells used for soft handover of the user equipment, send signaling from the RNC to a radio node associated with the given cell, said signaling indicating a scrambling code used by the user equipment for transmitting uplink E-DCH packets, to thereby enable the radio node associated with the given cell to decode the uplink E-DCH packets transmitted by the user equipment and thereby estimate the fraction of uplink E-DCH packets successfully received from the user equipment in the given cell.

16. The RNC of claim 10, wherein the indications include indications for a first cell that is active for MP-HSDPA transmissions to the user equipment, and indications for a second cell that is not active for MP-HSDPA transmissions to the user equipment, and wherein the processing circuit is configured to estimate from the indications received for the first and second cells whether the uplink quality of the second cell exceeds the uplink quality of the first cell, and to send signaling to configure the second cell to be active for MP-HSDPA transmissions to the user equipment, in response to a determination that the uplink quality of the second cell exceeds the uplink quality of the first cell.

17. The RNC of claim 10, wherein the set of cells comprises an active set of cells for soft handover of the user equipment, and wherein the processing circuit is configured to:
   monitor, via said indications, the fractions of uplink RLC packets successfully received from the user equipment in respective ones of the cells in the active set; and
   estimate the relative uplink qualities of respective ones of the cells in the active set based on the fractions of uplink RLC packets successfully received in respective ones of the cells in the active set.

18. The RNC of claim 10, wherein the set of cells comprises an active set of cells for soft handover of the user equipment, and wherein the processing circuit is configured to:
   monitor, via said indications, the fraction of uplink RLC packets successfully received from the user equipment in a first cell in the active set and monitor the fraction of uplink RLC packets successfully received from the user equipment in a second cell in the active set, said first cell being configured for MP-HSDPA transmissions to the user equipment and said second cell not being configured for MP-HSDPA transmissions to the user equipment;
   determine that the uplink quality in the second cell exceeds the uplink quality in the first cell, responsive to determining that the fraction of uplink RLC packets successfully received from the user equipment in the second cell exceeds the fraction of uplink RLC packets successfully received from the user equipment in the first cell; and
   configure the second cell for MP-HSDPA transmissions to the user equipment, in response to the determination that the uplink quality in the second cell exceeds the uplink quality in the first cell.

* * * * *